(12) United States Patent
Ristanovic et al.

(10) Patent No.: US 7,343,360 B1
(45) Date of Patent: Mar. 11, 2008

(54) EXCHANGE, SCHEDULING AND CONTROL SYSTEM FOR ELECTRICAL POWER

(75) Inventors: Petar Ristanovic, Maple Grove, MN (US); Milan Bjelogric, Plymouth, MN (US); James G. Frame, St. Paul, MN (US); Mohammed Aganagic, San Jose, CA (US); Mohammed Shahidehpour, Naperville, IL (US)

(73) Assignee: Siemens Power Transmission & Distribution, Inc., Wendell, NC (US)

( * ) Notice: Subject to any disclaimer, the term of this patent is extended or adjusted under 35 U.S.C. 154(b) by 0 days.

(21) Appl. No.: 09/272,471

(22) Filed: Mar. 19, 1999

Related U.S. Application Data

(60) Provisional application No. 60/085,352, filed on May 13, 1998, provisional application No. 60/085,240, filed on May 13, 1998, provisional application No. 60/085,364, filed on May 13, 1998.

(51) Int. Cl.
*G06F 17/00* (2006.01)
(52) U.S. Cl. ....................... 705/412
(58) Field of Classification Search ............. 705/1, 705/7, 8, 10, 26, 27, 28, 29, 35, 36, 37, 39, 705/40, 400, 412, 11, 38; 700/286–295
See application file for complete search history.

(56) References Cited

U.S. PATENT DOCUMENTS 5,237,507 A * 8/1993 Chasek .................. 705/412
5,629,862 A * 5/1997 Brandwajn et al. .......... 705/412
5,642,000 A * 6/1997 Jean-Jumeau et al. ....... 705/412
5,794,212 A * 8/1998 Mistr, Jr. ..................... 705/26
6,021,402 A * 2/2000 Takriti ......................... 705/412
6,047,274 A * 4/2000 Johnson et al. ............. 705/412
6,345,090 B1 * 2/2002 Walker et al. ................ 705/37

FOREIGN PATENT DOCUMENTS

JP  406078459 A  *  3/1994

OTHER PUBLICATIONS

Electricity Forecasting Study Group; "Load Forecastig".*
Wu, Y.-C., et al., "A Direct Nonlinear Predictor-Corrector Primal-Dual Interior Point Algorithm For Optimal Power Flows", IEEE Transactions On Power Systems, pp. 138-145.
Lugtu, R., "Security Constrained Dispatch", IEEE Transactions on Power Apparatus and Systems. vol. PAS-98, No. 1, Jan./Feb. 1979.

(Continued)

*Primary Examiner*—Igor N. Borissov

(57) ABSTRACT

A system for providing an automated, on-line forward market for the exchange and scheduling of electrical power and for the auctioning of fixed transmission rights (FTRs) on a power generation and distribution system. The system provides an on-line interface to multiple, remotely located market participants who can offer to buy or sell energy for next-day scheduling. Settlement of scheduled transactions can be done on a day-ahead as well as on a real-time basis. Scheduled transactions can also be modified on an hour-ahead basis. The market participants can also take part in a monthly auction of FTRs. The market system operates in conjunction with the control facilities of the power system. Both the day-ahead market and the FTR auction are carried out by the system as part of a process which ensures the secure and efficient operation of the power system.

20 Claims, 5 Drawing Sheets

OTHER PUBLICATIONS

Bacher, R., et al., "Security Dispatch Based On Coupling Of Linear And Quadratic Programming Techniques", IFAC Symposium Power Systems: Modelling And Control Applications. Brussels, Sep. 5-8, 1988.

Bacher, R., et al., "Real-Time Optimal Pwoer Flow In Automatic Generation Control", IEEE Transaction On Power Systems, vol. 3, No. 4, Nov. 1988.

Monticelli, A., et al., "Security-Constrained Optimal Power Flow With Post-Contingency Corrective Rescheduling", IEEE Transactions On Power Systems, vol. PWRS-2, No. 1, Feb. 1987, pp. 175-182.

Reid, G. F., et al., "Economic Dispatch Using Quadratic Programming", IEEE Transactions On Power Apparatus And Systems, vol. PAS-92, pp. 2015-2023, Nov./Dec. 1973, Depts. of Electrical Engineering of Virginia Military Institute and Virginia Polytechnic Institute and State University.

Lustig, I., et al., "Computational Experience With a Primal-Dual Interior Point Method For Linear Programming", Linear Algebra And Its Applications, 152:191-222, Elsevier Science Publishing Co., Inc., (1991), pp. 191-223.

Carpenter, T., et al., "Separable Quadratic Programming Via a Primal-Dual Interior Point Method and Its Use in a Sequential Procedure", ORSA Journal On Computing, vol. 5, No. 2, Spring 1993, pp. 182-191.

Lustig, I., et al., "On Implementing Mehrotra's Predictor-Corrector Interior-Point Method For Linear Programming", SIAM J. Optimization, vol. 2, No. 3, pp. 435-449, Aug. 1992.

Lu, C., et al., "Network Constrained Security Control Using An Interior Point Algorithm", IEEE Transactions on Power Systems, vol. 8, No. 3, Aug. 1993, pp. 1068-1076.

Lustig, I., "Feasibility Issues in a Primal-Dual Interior-Point Method for Linear Programming", Mathematical Programming, 49 (1991) 145-162, North-Holland.

Aganagic, M., et al., "Security Constrained Economic Dispatch Using Nonlinear", Dantzig-Wolfe Decomposition, IEEE Transactions on Power Systems, vol. 12, No. 1, Feb. 1997, pp. 105-112.

Ristanovic, P., "Successive Linear Programming Based Optimal Power Flow Solution", IEEE Tutorial Course, Optimal Power Flow: Solution Techniques, Requirements, and Challenges, presented at the 1996 IEEE Power Engineering Society Summer Meeting, Jul. 28-Aug. 1, 1996, IEEE Catalog No. 96 TP 111-0.

Wollenberg, B.F., et al., "A Real Time Optimizer For Security Dispatch", IEEE Transactions On Power Apparatus And Systems, vol. PAS-94, May 1994, pp. 1640-1649.

Bertram, T., et al., "An Integrated Package for Real-Time Security Enhancement", IEEE Transactions on Power Systems, vol. 5, No. 2, May 1990, pp. 592-600.

Elacqua, A., et al., "Security Constrained Dispatch at the New York Power Pool", IEEE Transaction on Power Apparatus and Systems, vol. PAS-101, No. 8, Aug. 1982, pp. 2876-2883.

Scott, B., et al., "Review of Linear Programming Applied to Power System Rescheduling", 1979 Power Industry Computer Applications Conference, pp. 142-154.

Alsac, O., et al., "Further Developments in LP-Based Optimal Power Flow", IEEE Transactions on Power Systems, vol. 5, No. 3, Aug. 1990, pp. 697-711.

*PJM Multi-Settlement System & FTR Auction Specification*, PJM Interconnection, L.L.C. (Mar. 19, 1998) PROPRIETARY.

\* cited by examiner

EXCHANGE, SCHEDULING AND CONTROL SYSTEM FOR ELECTRICAL POWER

RELATED APPLICATIONS

The present application is related to and claims priority from U.S. Provisional Patent Applications Nos. 60/085,352, 60/085,240 and 60/085,364, filed on May 13, 1998.

FIELD OF THE INVENTION

The present invention relates to the field of electrical power generation and delivery systems.

BACKGROUND INFORMATION

The electrical power industry in the United States and other countries is characterized by a network of regional power pooling arrangements among various power generators and users. In a typical pooling arrangement, several pool participants contribute generation and transmission resources to form a regional power generation and delivery system. Typically, one organization, which may be co-owned or be a joint venture of the pool participants, is responsible for operating the regional power generation and distribution system. Such an organization may also be referred to as an Independent System Operator (ISO).

One ISO has proposed an energy market which comprises a multi-settlement system and a fixed transmission rights (FTR) auction system. (See "Operating Agreement of PJM Interconnection, L.L.C.," Dec. 31, 1997). This proposal calls for a "two-settlement" system and a Fixed Transmission Right (FTR) auction system. The two-settlement system is to perform scheduling and price calculations for a day-ahead and a real-time market for energy. The FTR auction system is to manage the auction of FTRs. An FTR entitles its holder to revenues (or charges) based on the capacity of the FTR and the energy price difference between a source and a sink. As such, an FTR can be used to provides its owner with the right to transfer a specific amount of power over a transmission path for a specific price, regardless of congestion charges that might otherwise apply.

The provisioning of resources in a deregulated, market-oriented power generation and delivery system is a complex, multi-dimensional problem which must be solved repeatedly and accurately to ensure the efficient and secure operation of the system. This problem is further complicated by the integration therewith of an energy market system such as the aforementioned. Unlike conventional markets, such as securities markets where financial interests are exchanged, the transactions of an energy market, as proposed, are subject to the physical constraints of the underlying energy system. It is unclear how the security and efficiency considerations in the operation of a power system can be reconciled with the dynamics of an open market system.

There is therefore a need for a system that can support a forward market for the provision of energy over a power system while ensuring the efficient and secure operation of the power system.

SUMMARY OF THE INVENTION

The present invention provides an energy market system which operates in conjunction with an existing power system control infrastructure. The energy market system of the present invention allows market participants, who are typically electrical power generators and/or power consumers, to buy and sell electrical power and rights in future power delivery.

An exemplary embodiment of a market system in accordance with the present invention comprises a multi-settlement subsystem and a Fixed Transmission Right (FTR) auction subsystem.

The multi-settlement subsystem (MSS) provides market participants with the ability to participate in one or more forward markets for electric energy. In the exemplary embodiment described, a two-settlement system is provided, with one settlement based on a day-ahead market and another, real-time settlement based on actual system operation and real-time prices. A primary function of the MSS is to develop day-ahead and hour-ahead supply and demand schedules based on bid prices and desired and available quantities and to coordinate these schedules with the requirements of reliable power system operation. In addition, the MSS determines Locational Marginal Prices (LMPs) for the energy network.

The FTR Auction subsystem provides for the purchase and sale of FTRs in a centralized auction. Market participants may submit bids for the purchase of FTRs in the auction. They may also offer FTRs for sale in the auction. The auction system will maximize the revenues from the FTR while maintaining the ability of the transmission system to simultaneously support the awarded FTRs.

DETAILED DESCRIPTION

Figure 1:
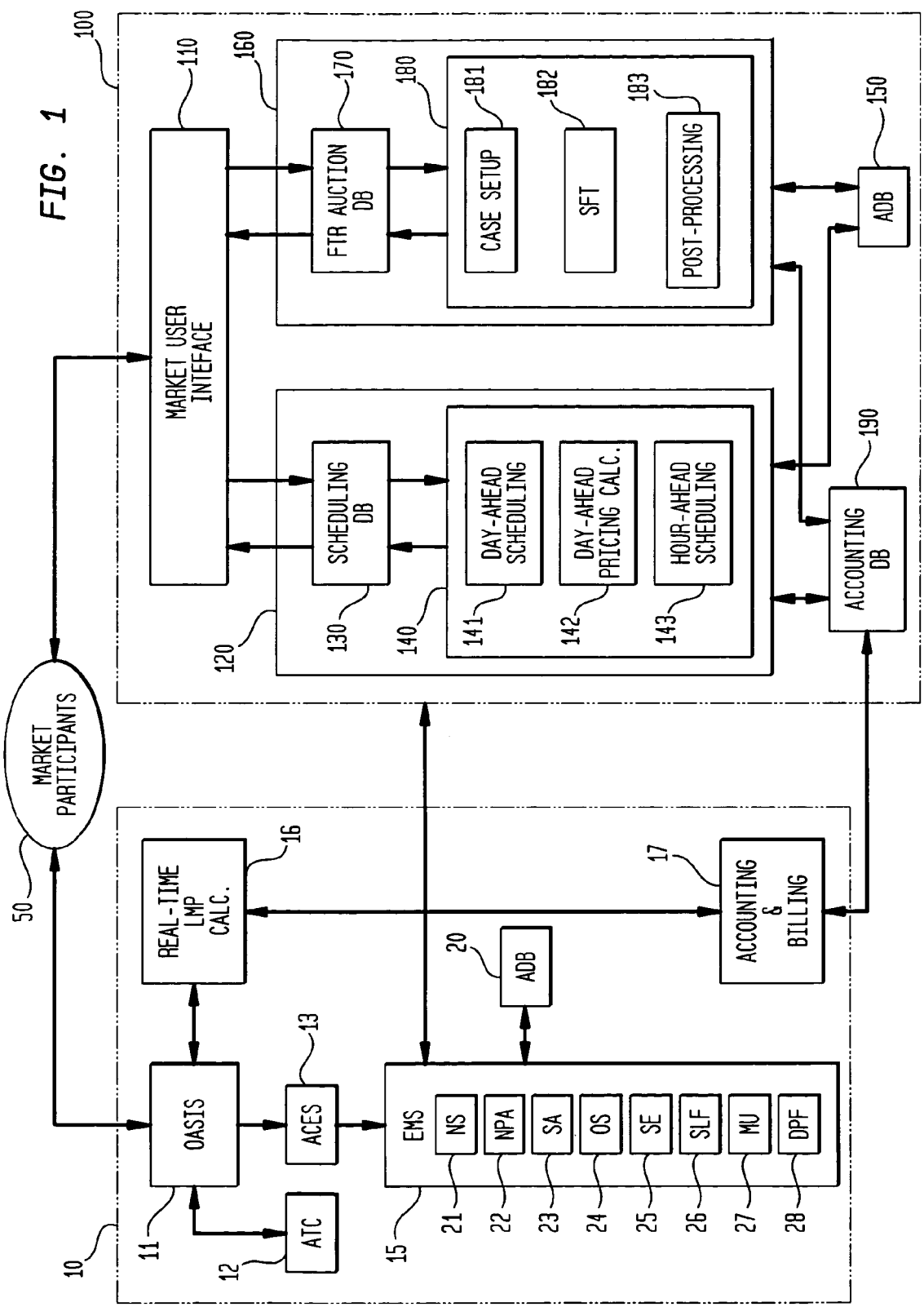
FIG. 1 is a block diagram of an exemplary embodiment of an energy market system in accordance with the present invention in conjunction with exemplary power system control system functions.

FIG. 1 shows a functional block diagram of an exemplary embodiment of an energy market system 100, in accordance with the present invention, in conjunction with control facilities 10 of an exemplary power generation and delivery system, such as that operated by a power pooling organization or Independent System Operator (ISO). The system 100 comprises a Market User Interface (MUI) 110, a Multi-Settlement Subsystem (MSS) 120, a Fixed Transmission Right (FTR) Auction Subsystem (FTRAS) 160, an applications database (ADB) 150 and an Accounting Database 190.

The MUI 110 acts as gateway between Market Participants 50 and the MSS 120 and FTRAS 160 of the energy market system 100. The MUI 110 is preferably expandable, allowing for the addition of future applications beyond the scheduling and auction applications of the exemplary system shown.

The MSS 120 enables one or more forward markets for the purchase and sale of electric energy, with a day-ahead market and a real-time market being provided. The FTRAS 160 enables an auction for the purchase and sale of FTRs.

These subsystems will be described in greater detail below.

The control facilities 10 of a typical power generation and delivery system comprise well-known functional components, including an Energy Management System (EMS) 15 which provides real-time control of the power system. An application database (ADB) 20 is associated with the EMS 15. The ADB 20 contains information for modeling the power network. Data in the ADB 20 is provided to the ADB 150 in the energy system 100, described more fully below.

The EMS 15 includes several well-known network analysis functions which interact with and provide information that is used by the energy market system 100 of the present invention. A standard network analysis function included in the EMS 15 is a Model Update (MU) function 27 which generates a bus model of the power network based on a detailed network model and network configuration information (e.g., switch positions). Network topology, the normal status of logical devices and transformer and phase-shifter tap positions, are available from the ADB 20. The logical device status changes associated with a scheduled outage are available from a list of scheduled outages in an Outage Scheduler (OS) function 24.

The bus model generated by the MU function 27 is used by other functions such as a Dispatcher Power Flow (DPF) function 28, a Security Analysis (SA) function 23, and a Security Constrained Dynamic Optimal Power Flow (SC-DOPF) procedure, described below. The MU function 27 also includes standard subfunctions such as bus model updating, load scheduling, interchange scheduling, generation scheduling and regulating equipment scheduling.

A Network Parameter Adaptation (NPA) function 22 in the EMS 15 maintains scheduled values (e.g., by hour), such as interchange values and various setpoints and tap settings for regulating equipment.

A Dispatcher Power Flow (DPF) 28 function of the EMS 15 provides the Dispatcher/Operator mode of an Optimal Power Flow (OPF) procedure (described below). The DPF produces a solution of the power flow problem for a given set of network conditions. This solution satisfies the bus power-balance equations (static load flow equations) for given values of generation, load, and net interchange. The DPF 28 solves the power flow problem without optimization.

Other functions of the EMS 15 include a State Estimator (SE) 25, a Network Sensitivity (NS) function 21, a system load forecast (SLF) function 26 and various functions for transferring data between the EMS functions and the energy market system 100.

The power system control facilities 10 typically include an OASIS (Open Access Same-time Information System) subsystem 11 which provides an on-line interface (e.g., over the Internet) to the market participants 50 for requesting and scheduling transmission service. An ATC (available transfer capability) function 12 provides information regarding the power network's available transmission capacity to OASIS 11 for posting to the market participants. An ACES (accounting, contracts and energy scheduling) function 13 is provided for scheduling exchanges of energy between various utilities. A real-time locational marginal price (LMP) calculation function 16 is included for determining LMPs during actual system operation. An accounting and billing function 17 is also included. As with the EMS 15, the aforementioned functions and their implementations are well-known.

Figure 2:
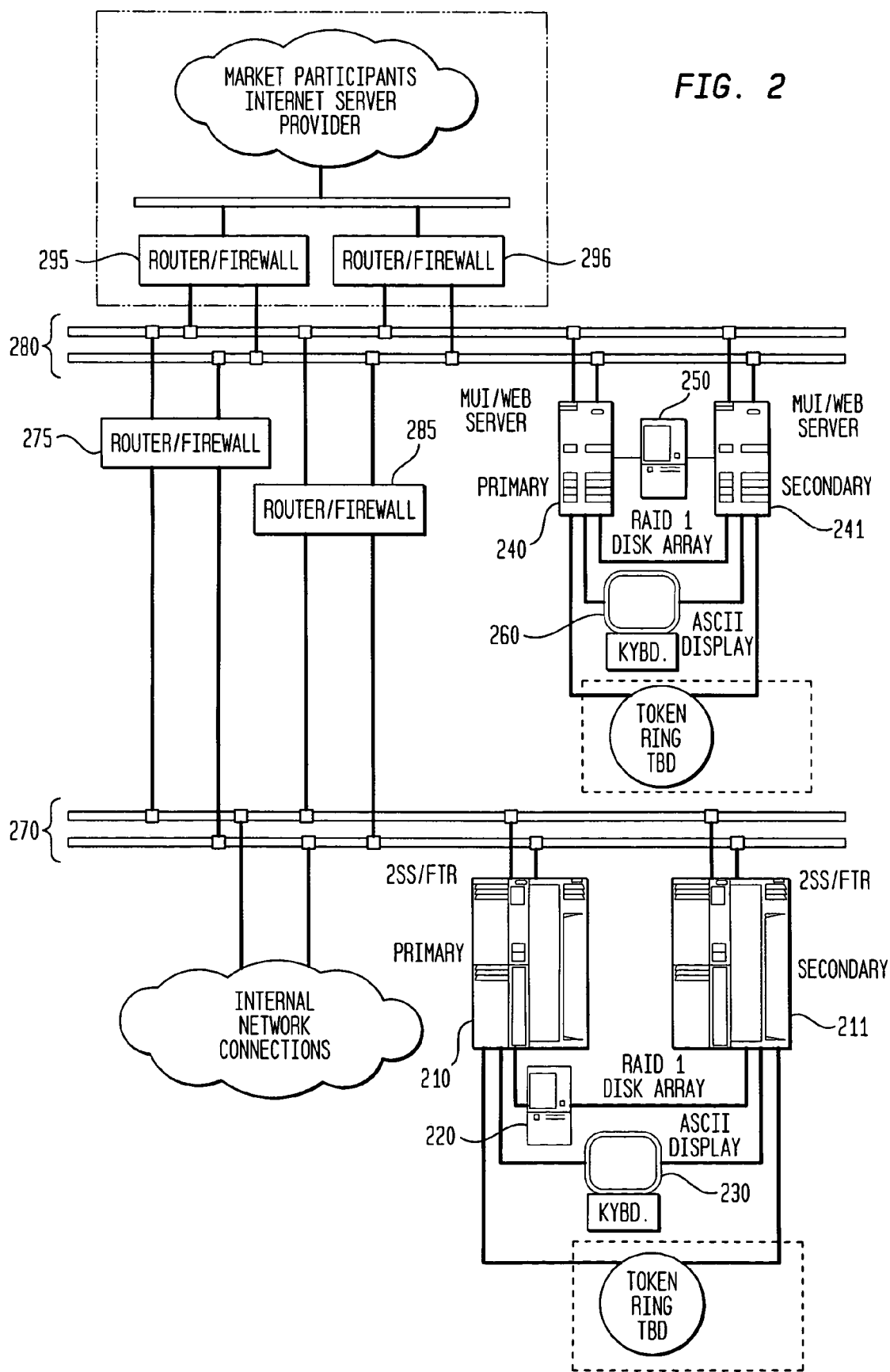
FIG. 2 is an exemplary embodiment of a hardware arrangement for an energy market system in accordance with the present invention.

FIG. 2 shows an exemplary hardware platform configuration for the system of FIG. 1. The exemplary configuration of FIG. 2 includes redundancy to ensure reliable and continuous operation, although as can be understood, it can also be implemented without redundancy, depending upon the requirements of the application.

The configuration of FIG. 2 comprises redundant database/application servers 210 and 211 for carrying out the functions of the Multi-Settlement Subsystem 120 and the FTR Auction Subsystem 160. The servers 210, 211 can be implemented, for example, using 64-bit IBM RS/6000 S70 computers, each configured with 12 CPUs. Mass storage for the database/application servers 210, 211 can be provided, for example, by a RAID 1/SSA disk array 220. The databases 120, 150 and 160, for instance, would be maintained on the disk array 220 by the servers 210, 211. A terminal 230 with ASCII display and keyboard provides a user interface to the servers 210, 211 for system administration and operation functions.

In the exemplary configuration of FIG. 2, redundant servers 240, 241 are used to carry out the functions of the MUI 110. A pair of IBM RS/6000 F50 workstations configured with 2 CPUs each can be used as the servers 240, 241. As with the database/application servers 210, 211, a RAID 1/SSA disk array 250 and a terminal 260 with ASCII display and keyboard are shared by the MUI servers 240, 241.

The server pairs 210, 211 and 240, 241 are configured on dual redundant LANs 270 and 280, respectively. The LANs 270 and 280 can be implemented as 10 and/or 100 Mbs Ethernet LANs. The LANs 270 and 280 are coupled via redundant routers/firewalls 275 and 285. The routers/firewalls 275, 285 isolate the database/application servers 210, 211 from the market participants as required. Such routers/firewalls are available from Cisco Corporation.

In the exemplary configuration of FIG. 2, market participants can access the system 100 over the Internet. The redundant LAN 280, to which the MUI servers 240, 241 are coupled, is coupled to the Internet via an Internet Service Provider (ISP) via a redundant pair of router/firewalls 295, 296. The database/application servers 210, 211 are further isolated from the MUI servers through the router/firewalls 275, 285.

The exemplary configuration of FIG. 2 provides the compute power and reliability to ensure the timely execution of the multi-settlement process. As can be understood, however, other configurations are possible within the scope of the present invention.

The system 100 of FIG. 1 is implemented on a software platform which is implemented on the exemplary hardware platform of FIG. 2. An exemplary embodiment of a software platform includes the AIX operating system at level 4.3 with High Availability Clustered Multi Processor (HACMP) technology that automatically detects system failures and recovers users, applications and data on the backup. In addition, the tools to support the market participant interfaces and the database related activities can be provided by Oracle 8 Server, Oracle Web Server, Oracle Parallel Server, Oracle Developer/2000 Server and Oracle Developer/2000. The network application database related tasks can be handled using Siemens' high performance ADB.

The system 100 includes several databases, such as a scheduling database 130, an FTR auction database 170, the accounting database 190 and the application database (ADB) 150. The public data in the databases 130, 170 and 190 and all of the private data not required for network applications execution can preferably be stored and maintained in a general purpose Oracle database. The data required for execution of network applications (e.g., network model data) is stored and maintained in the application database (ADB) 150. The ADB 150 contains data similar to that in the ADB 20 associated with the EMS 15. The databases preferably support hot backup without taking the applications or database servers offline.

A set of APIs supports data exchange internally, inside the system 100 and externally with other systems and the MUI.

Figure 3:
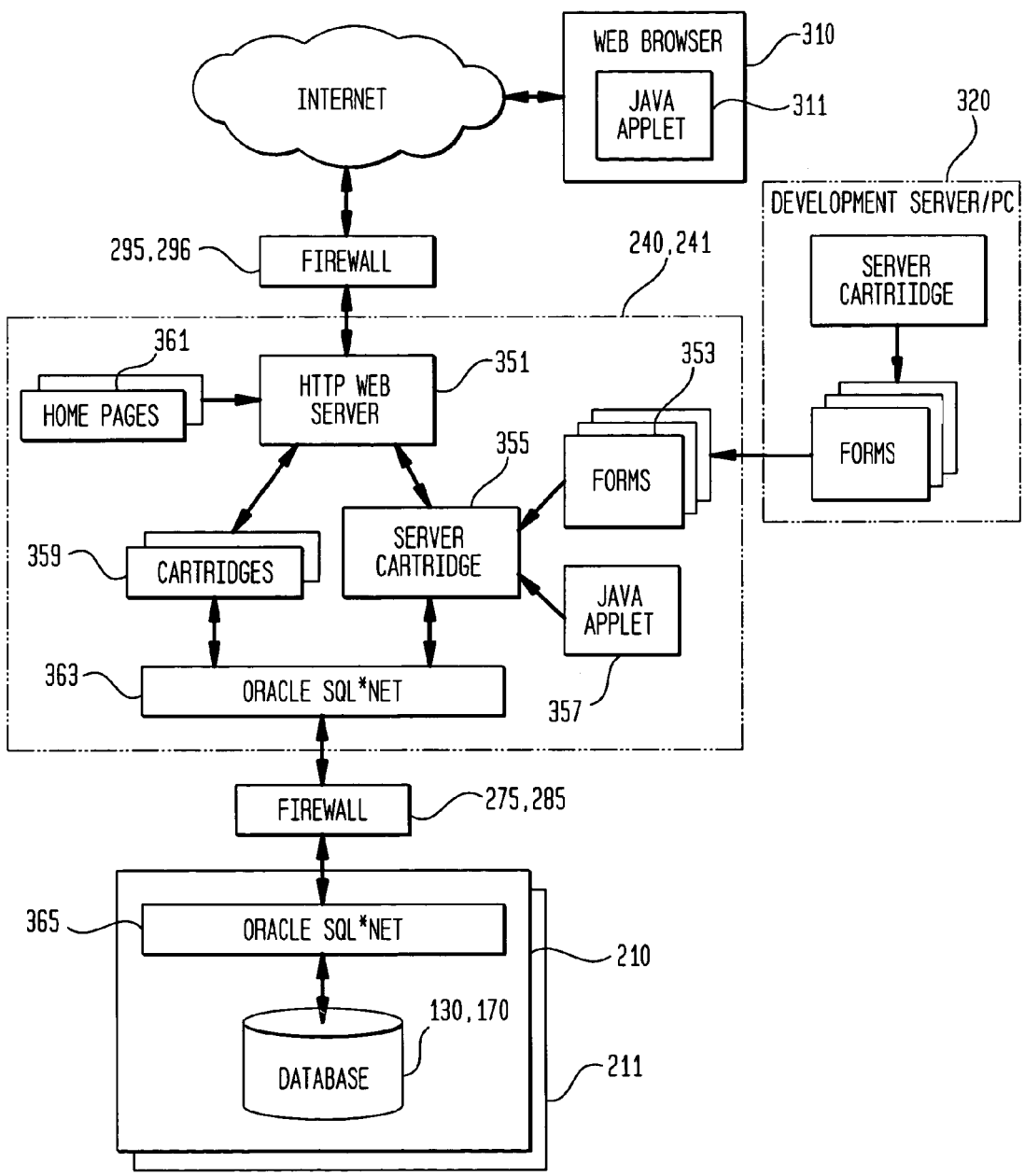
FIG. 3 is an exemplary embodiment of a software platform for a market user interface in an energy market system in accordance with the present invention.

FIG. 3 is a block diagram showing the various software components involved in the interface between market participants and the energy system 100. In the exemplary embodiment of FIG. 3, the redundant MUI servers 240, 241 run a HyperText Transfer Protocol (HTTP) Internet Server 351, such as the Oracle Web Server, which interfaces with the application-specific databases 130, 170 to return dynamic web pages to the Market Participant 310. Home pages 361 provide information about the energy market and other relevant user information. An Oracle Developer/2000 Server Cartridge 355 is also installed with the Oracle Web Server 351 in order to provide Oracle Web enabled Forms capability. The use of the Oracle Forms product is extended through the use of the web enabled forms capability.

Internal users can access the energy market system for administrative (e.g., maintenance and development) purposes over the LAN 270 in a client-server configuration with user interface (UI) clients and the database/application servers 210, 211. The UI clients can run, for example, Oracle Forms and/or the Siemens ADV tool with X emulation on NT Workstations (Exceed or similar tool). For Market Participants, Oracle Web-enabled forms and templates can be used for the upload and/or download of data.

Market Participants can access the energy market system 100 via the Internet by using a web browser 310, such as Netscape Navigator or Microsoft Internet Explorer. For security, Secure Sockets Layer (SSL), 128 bit encryption, server-side certificates and client-side certificates are also preferably supported.

When the HTTP Web Server 351 receives a Uniform Resource Locator (URL) from a browser 310 located on the World Wide Web (or on a local network using HTTP), the Web Server 351 draws on information from the database 130, 170 and the operating system's file system, as necessary, to respond to the request. The file system can be used for static Web pages and the database can be used for Web pages that are generated at runtime using "live" data.

The Forms component of Developer/2000 for the Web consists of two components: the Forms Client and the Forms Server. The Oracle Developer/2000 Server is installed in a MUI server 240, 241 as a WRB cartridge 355.

The Forms Client is a Java applet 311 which is downloaded at runtime to an end user's Web browser and displays the form's user interface and manages interaction between end users and the Forms Server. The Forms Client 311 receives "bundles" of interface commands from the Forms Server and translates them (in sets) into interface objects for the end user The Forms Server includes a listener and a runtime engine. The listener initiates the Forms runtime session and establishes a connection between the Forms Client and the Forms Server Runtime Engine. The runtime engine handles all form functionality except UI interaction, including trigger and commit processing, record management, and general database interaction. The Forms Server Runtime Engine (and all application logic) is installed on the MUI (240, 241) and the database/application servers (210, 211), not on client machines. All trigger processing occurs on the application database and MUI servers, while user interface processing occurs on the Forms Client. Further information regarding this exemplary arrangement is available from Oracle Corporation. As can be understood other arrangements are possible within the scope of the present invention.

As can be understood in light of the present disclosure, the specific displays and presentation of information at each market participant are designed in accordance with the business rules surrounding a Market Participant login session including specific rules for data integrity, reasonability, confidentiality and availability. Furthermore, upload/download templates are provided for the transferal of Market Participant information.

Exemplary hardware and software platforms for the energy market system 100 of the present invention have thus far been described. The two exemplary applications or subsystems of the energy market system 100 will now be described in greater detail, beginning with the multi-settlement subsystem 120.

Multi-Settlement Subsystem

The multi-settlement subsystem (MSS) 120 provides the market participants 50 with the ability to participate in a forward market for electric energy. In the exemplary embodiment described, there is a day-ahead market and a real-time market. A primary function of the MSS 120 is to develop day-ahead and hour-ahead supply and demand schedules based on bid prices and quantities and to coordinate these schedules with the requirements of reliable power system operation. In addition, the MSS 120 determines Locational Marginal Prices (LMPs) for the energy network.

Figure 4:
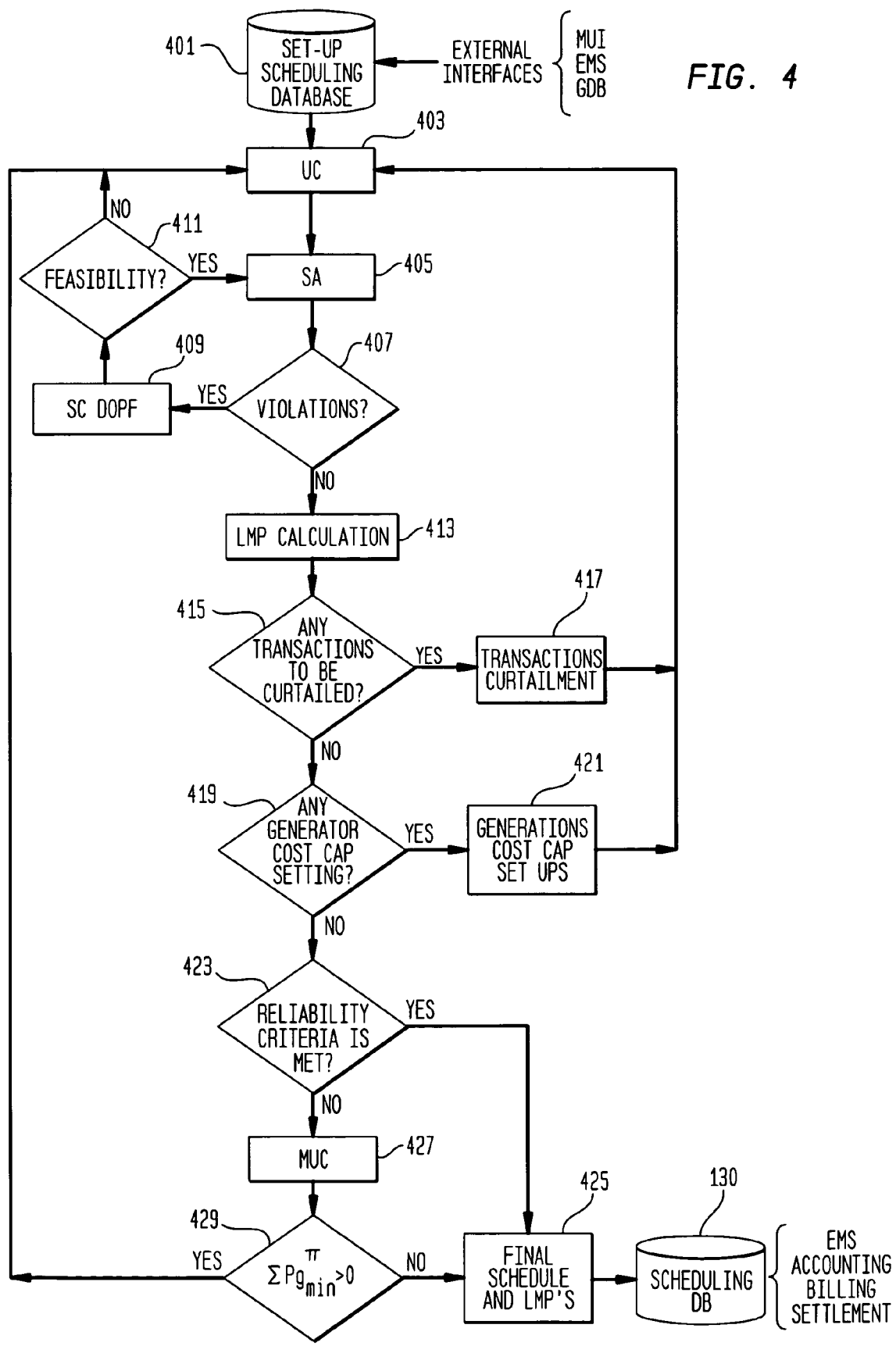
FIG. 4 is a flow chart of an exemplary process for conducting day-ahead energy scheduling in accordance with the present invention.

FIG. 4 is a flow chart showing an exemplary process performed by the MSS 120 in providing day-ahead scheduling and LMP calculation. A purpose of the day-ahead scheduling and LMP calculation process of FIG. 4 is to evaluate bids submitted by market participants 50, more specifically, generators and load serving entities (LSEs) for the day-ahead energy market with the objective of devising an economical commitment and dispatch of generation with associated LMPs.

The commitment and dispatch of generation resources in accordance with the exemplary process of FIG. 4 is characterized by a plurality of features and capabilities, including one or more of the following:

handling generator bids which contain start-up, no-load, and energy prices, start-up time and ramping constraints, minimum run time, and minimum off time until next start-up;

respecting limits on the maximum number of starts per day or per week for each of a plurality of generating units;

modeling transmission losses, fixed generation, fixed demand, dispatchable generation and demand, and fixed bilateral transactions;

modeling transaction curtailment;

modeling increment and decrement bids associated with transactions;

market power mitigation using generator price caps in the event of transmission congestion;

handling limited energy units with maximum up time constraints;

least-cost commitment and scheduling of generation to meet the market forecast load (sum of load bids) taking into account reserve requirements and n–1 security requirements;

commitment and scheduling of additional resources to cover the difference between forecasted generating and forecasted load based on minimization of start-up and no-load cost, taking into account reserve requirements and n–1 security requirements;

respecting security criteria considering a full transmission system model that accommodates reactive interface limits and single-contingency thermal limits respecting all contingencies monitored in the current EMS system; and fully-automated daily schedule production with fast execution time (e.g., less than 40 minutes).

In executing the process of FIG. 4, day-ahead hourly cases are first set-up in the Scheduling Database 130 at step 401. Step 401 is preferably carried out as an automated procedure in order to satisfy the time constraints of the day-ahead scheduling process. The setup procedure in step 401 takes the information entered by the Market Participants, and information produced by the EMS functions and other sources (e.g., maintenance plans, weather forecasts), processes this raw data and produces 24 hourly sets of data that can be used by the various procedures and functions involved in the operation of the MSS 120.

An exemplary list of data that is setup in the scheduling database 130 includes:
market entered information about generation and load bids;
full breaker-oriented model of the transmission network;
penalty factors from the EMS NS function 21;
scheduled values from the EMS NPA function 22;
current real-time contingency list from the EMS SA function 23;
relevant outage information from the EMS OS function 24;
the latest EMS SE 25 solution
load forecast results from the EMS SLF function 26;
the status (from the EMS) of generation equipment with long start-up requirements for the first hour of the operating day;
transmission reliability limits;
transfer interface limits;
branch ratings;
fixed generation and load as well as bilateral transactions;
definition of price aggregation zones;
input data for transaction curtailment in the case of congestion;
input data for market power mitigation using generator price caps; and
end conditions from previous unit commitment run.

Once the scheduling database 130 has been set-up in step 401, execution proceeds to step 403 in which a unit commitment (UC) procedure is carried out.

An exemplary UC procedure in accordance with the present invention operates on a multiple-day horizon (e.g., 5, 7 days) in order to take into account the effect of the end conditions of the one-day scheduling horizon. In other words, the UC procedure compensates for the possible myopia of the short (24 hours) scheduling period. This avoids the problem, for example, of shutting down some units at the end of one day even though the capacity may be needed the next day.

The UC procedure executed at step 403 is price-based; i.e., it produces the most economical commitment of generation over the next day which meets the market forecasted load and appropriate network reserve requirements. In this UC procedure, a subset of major transmission line limits is directly modeled and enforced. This subset contains the transmission lines that are known to have been run against the limits in the recent past (and as such may likely be overloaded again). Any other useful criteria from past experience may also be used to identify such a subset. An exemplary UC procedure in accordance with the present invention will be described below in greater detail.

The execution of the UC procedure at step 403 yields a schedule which is then evaluated in light of "n-1 security" criteria in the next series of steps (steps 405, 407, 409 and 411).

At step 405, a Security Analysis (SA) procedure is carried out. The SA procedure of step 405 is similar in functionality to the SA function of the EMS 15 but is executed, independently, by the MSS 120. The SA procedure of the MSS simulates one or more contingency cases (e.g., performs an AC analysis) and identifies all violations resulting from the simulation. The contingency cases are provided in a contingency list which is typically prepared by the ISO and maintained by the EMS 15. The SA procedure also produces corresponding linearized functional constraints (e.g., branch flow constraints) and adjusted control variable limits which are passed to the SCDOPF procedure, described below. The SA procedure is executed for each hour, preferably in parallel for each hour separately using the parallel CPU architecture of the database/application servers 210, 211. An exemplary SA procedure is described in further detail below.

Once each contingency in the contingency list has been simulated by the SA function, it is determined at step 407 whether there would be any violations if the system were to operate under any one of the contingencies. If it is determined at step 407 that there would be violations, execution proceeds to step 409 in which a Security Constrained Dynamic Optimal Power Flow (SCDOPF) procedure is carried out. The SCDOPF procedure determines the optimal dispatch of generation in light of the linearized functional constraints prepared by the latest SA run (at step 405), the upper and lower limits on control variables, reserve constraints, and ramping constraints. An exemplary embodiment of a SCDOPF procedure is described in greater detail below. The SA and SCDOPF procedures operate in a closed loop, executing iteratively, to converge on a solution.

There are two possible outcomes of the execution of the SA-SCDOPF loop (steps 405-409). One possibility is that the overall process converges and it is determined at step 407 that there would be no violations for any contingency listed in the contingency list. In this case, execution proceeds to step 413 in which the calculation of LMPs is performed.

If it is determined at step 411 that the SA-SCDOPF loop cannot produce a feasible solution, it means that n-1 security cannot be met with the existing commitment. In that case, the set of constraints that cannot be satisfied (the "critical constraints"), as determined by the last execution of the SCDOPF procedure, is provided to the UC procedure (step 403). The UC procedure is run again (at step 403) with an expanded list of transmission constraints. As a result, the UC procedure produces a new commitment which takes into account the new critical constraints. The SA-SCDOPF loop (steps 405-409) is executed again until it converges on a violation-free solution, as determined at step 407. As described above, execution then proceeds to step 413 in which the LMPs are calculated. An exemplary procedure for calculating LMPs is described more fully below.

After the LMPs have been calculated in step 413, execution proceeds to step 415 in which it is determined if any transactions are to be curtailed because one or more of the parties to the transactions are not willing to pay congestion charges. Congestion charges apply when the LMP at a delivery point is greater than the LMP at the point of generation. Whether congestion charges will apply to a particular transaction is thus determined when the LMPs are calculated, at step 413, in accordance with the schedules produced by the UC/SA/SCDOPF solution generated in steps 403-411. The congestion charges thus determined may for some transactions exceed the maximum congestion charges the parties to those transactions are willing to pay. If so, those transactions are to be curtailed, as determined in step 415. As mentioned above, curtailment information (e.g., when, how and/or how much to curtail) is loaded into the scheduling database 130 at step 401. If there are multiple transactions to be curtailed, additional curtailment criteria can be applied to determine which transactions to curtail, in which order, to which extent, etc. Such criteria may include whether or not a transaction considered for curtailment might otherwise contribute to a congestion condition. At step 417, the transactions selected for curtailment are curtailed accordingly and execution loops back to repeat the UC/SA/SCDOPF/LMP processing steps 403-413, giving effect to the curtailments.

After transaction curtailment and re-execution of the UC/SA/SCDOPF/LMP procedures, execution proceeds to step 419 in which it is determined whether there are any generator price caps that come into effect (as specified in data loaded at step 401 into the scheduling database 130). If price capping is to be performed for some generation units, execution proceeds to step 421, in which the price caps are put into effect, and then loops back to repeat the UC/SA/SCDOPF/LMP procedures with modified price bids for those generation units to which price capping applies.

Once the UC/SA/SCDOPF/LMP processing has been repeated taking into account the price caps, execution proceeds to step 423 in which it is determined whether the optimal schedules thus produced meet predetermined reliability criteria (e.g., reserve capacity, number or severity of violations under certain contingencies, the difference between scheduled generation capacity and forecasted load). Such criteria are typically specified by the ISO. In making this determination, the total forecasted load for the period (as forecasted, for example, by the energy system operator) plus appropriate reserve requirements is compared to the amount of load bids plus an appropriate reserve. If the difference is below a predefined tolerance, the day-ahead scheduling and LMP calculation process is deemed complete and execution proceeds to step 425 in which the final schedules and LMPs are written to the scheduling database 130.

If, however, it is determined at step 423 that the difference between the forecasted load and demand bids does not meet the predetermined reliability criteria, it is necessary to commit additional generator resources to cover this difference. The additional resources include available units that were not committed in the UC procedure of step 403. These resources are dedicated for providing spinning reserve service and include mostly gas turbines and other fast starting units and units that can run with little or no load ("no-load" units). Commitment of these units is carried out in step 427 by a Marginal Unit Commitment (MUC) procedure.

The MUC procedure is a special application of the UC procedure of step 403. The MUC procedure includes the features of the UC procedure except the modeling of transmission constraints. The MUC procedure is also used for supplemental unit commitment runs during hour-ahead scheduling in the case of forced outages or unusual load forecast error, as described more fully below in connection with hour-ahead scheduling. Usually, the MUC procedure commits, as spinning reserve, only no-load generation units. It is possible however that some of the reserve units committed at step 427 have positive minimum loads. In order to use such units for providing reserve power, it is necessary to operate those units at their minimum loads. If it is determined at step 429 that the sum of the minimum loads of the reserve units committed by the MUC procedure in step 427 is zero, the day-ahead scheduling and LMP calculation process is deemed complete and the final schedules and LMPs are written at step 425 to the scheduling database 130. If, however, any of the committed reserve units (for instance, a steam generator) has a minimum load greater than 0, execution loops back to step 403 so that the day-ahead scheduling and LMP calculation process is repeated starting from the UC procedure. The UC procedure is re-run taking into account the reserve generation units committed by the MUC procedure in step 427.

If the total minimum power of all units committed by the UC and MUC procedures at steps 403 and 427 is less than the market forecasted load for any hour of the day in question, the UC run at step 403 will be skipped. In this case, 24 hour closed loop SA-SCDOPF execution is performed in order to find the optimal dispatch, while considering the minimum power limits of the units committed in step 427 and satisfying n−1 security.

If there is over-generation, i.e., if the total minimum power of all units committed in steps 403 and 427 is greater than the market forecasted load for any of the 24 hours, the difference between the total minimum power and the total load is calculated by the MUC procedure and the UC procedure of step 403 is repeated. The purpose of this run is to find a commitment solution which eliminates the over-generation either by re-committing units committed by the MUC procedure, modeling units committed in the UC procedure as "must run" units, or as a last possibility, re-committing all units committed by both the UC and MUC procedures.

The various functions involved in the scheduling process of FIG. 4 will now be described in greater detail.

Security Analysis

The Security Analysis (SA) procedure analyzes system security under contingency conditions. The procedure operates upon a solved power flow network called the base case. The base case corresponds to one of the 24 hours being analyzed and includes the latest generation schedule as determined by the last execution of the Unit Commitment (UC) procedure.

The SA procedure performs several functions which will now be described.

A function of the SA procedure is to simulate contingencies and analyze system security under each contingency specified in a contingency list provided by the EMS 15. The contingency list can include one or any combination of the following equipment changes:

branch element outages (lines, transformers, phase-shifters, series devices);
    generator unit outages;
    Static Var Compensator (SVC) outages;
    load element outages;
    shunt capacitor/reactor outages; and
    switching device changes.

A piece of equipment can be placed in service by explicitly defining all of the switching device changes required to place the piece of equipment into service.

Any line or transformer can be identified in the ADB database as potentially causing a topology change when it is outaged. When a contingency includes the outage of one of these branches, the contingency will be analyzed for the possibility of a topology change and the solution obtained will use a new model containing the new topology, if required.

A Contingency Editor is used to maintain the contingency list. The contingency list that exists in the EMS's real-time SA function may also be retrieved on request.

Contingencies can be organized into groups. Operator-settable flags can be used to include/exclude each contingency from each of the contingency groups. Another set of operator-settable flags activate/deactivate each of the contingency groups. Any contingency which is enabled in at least one active group is evaluated by the SA procedure.

The SA procedure employs a contingency screening function to rank the contingencies specified in the Contingency List. This ranking is done according to the calculated severity of the resulting branch real power overloads and/or the calculated severity of the resulting voltage and reactive power limit violations. In the screening phase, network voltages and flows are estimated by a relatively small number of iterations of a Fast Decoupled Power Flow (FDPF) function. Implementations of such a function are well known. The number of iterations can be user-specified. Selected contingencies are later solved by a full FDPF. Quantities that are to be monitored for limit violations can be specified by a system operator in a Violation Check List.

The contingency screening function processes the contingencies that are enabled in one or more of the active contingency groups. The screening function sorts all contingencies into two separate Screened Contingency Lists: 1) a Real Power Screened Contingency List, in which contingencies are sorted according to the expected severity of branch real power overloads; and 2) a Voltage/Reactive Power Screened Contingency List, in which contingencies are sorted according to the expected severity of bus voltage limit violations or bus reactive power limit violations.

A user may select either or both Screened Contingency Lists for full simulation. Contingencies in the Screened Contingency Lists are simulated until a "Stopping Criterion" is met. Stopping Criteria may take one of the two forms: "Simulate the top N cases in the list" (the "N" criterion) or "Simulate all cases with possible violations." (the "ALL" criterion). Contingencies which are flagged as "must run" are automatically selected for full simulation. As some contingency cases may be in both screened lists, the lists will be merged and redundant entries eliminated before full analysis takes place.

If the "ALL" criterion is selected, then after the desired number of screening iteration(s) of the FDPF for each contingency, the solution is checked for possible violations. If a violation is detected, the solution process directly continues with a full AC analysis until a converged solution is obtained. This solution is then checked again for violations. If there is no violation after the screening iteration(s), the full solution is not required or performed. If the "ALL" stopping criterion is selected, no performance indices are computed and no screened contingency rankings are performed If the "N" criterion is selected, then all contingencies are screened first. Ranking is performed based on the performance Indices which are calculated after the screening iterations. The performance index of a contingency is indicative of the severity of the contingency. During screening, two rankings are produced, one based on the "worst individual violation" and the other based on overall severity. The user may preselect the ranking criteria to be used. Contingencies for which no violation is detected have a performance index value equal to zero and thus no ranking is done for these cases. The top "N" cases from both the Real Power Screened Contingency List and the Voltage/Reactive Power Screened Contingency List are selected for full analysis.

The contingency ranking for screening is only performed when the "N" stopping criterion is selected. Only the contingencies that have violations during the screening are ranked. However, a user-specified global screening threshold percentage is available. This screening threshold percentage is multiplied by each of the violation thresholds and is used only during screening. By setting this threshold to some very small percentage, the screening function of the SA procedure is forced to calculate a performance index for each contingency. The user also has the option of setting the threshold to 100%, in which case, only the contingencies with violations during screening will have a performance index calculated.

Selected contingencies are then solved by a full FDPF. For both screening options ("N" or "ALL"), generation and ranking of the violation output are based on the results of the full FDPF analysis.

The exemplary SA procedure of the present invention can simulate and solve contingencies that result in islanded systems and isolated buses. For every island, a new slack bus is assigned and all islands are solved simultaneously. Furthermore, the solution of the SA procedure can be obtained with or without generator MVAR limits enforced. This option is user-selectable.

For each contingency simulated, specified elements are checked for limit violations (e.g., line overloads). All contingencies which cause violations are listed along with the identification and magnitude of the violations. The base case is automatically checked for violations.

Any branch which has a violation under one or more contingencies is classified to be in either trend mode or contingency mode. The SA procedure will flag a branch as being in contingency mode if the maximum flow on the branch that results from any of the contingencies being evaluated exceeds the branch's long-time emergency limit. The SA procedure will flag a branch as being in trend mode if the maximum flow on the branch that results from any of the contingencies being evaluated is between its normal limit and its long-time emergency limits (or short-time emergency or load dump if selected).

Any monitored bus voltage which has a violation under one or more contingencies is classified to be in either trend mode or contingency mode. Three separate voltage trend displays are provided on the operator terminal 230: Voltage Drop Trend, Low Voltage Trend, and High Voltage Trend. For Voltage Drop, the SA procedure will flag a bus voltage as being in trend mode if the voltage drop exceeds a Voltage Drop Warning Limit but not a Voltage Drop Limit. For Low Voltage, the SA procedure will flag a bus voltage as being in trend mode if the post-contingency voltage at the respective bus is below a Normal Low Limit (user-specified) but not an Emergency Low Limit (also user-specified). For High Voltage, the SA procedure will flag a bus voltage as being in trend mode if the post-contingency voltage at the respective bus is above a Normal High Limit but not an Emergency High Limit. Bus voltage trends may appear on one, two, or all three of the voltage trend displays. Any bus voltage which is in contingency mode, i.e., exceeds the Voltage Drop Limit, Emergency Low limit, or Emergency High limit for one or more contingencies, will not appear on the respective Voltage Trend display. The aforementioned limits are user-specifiable.

The contingencies simulated by a full solution are ranked separately for thermal overloads and voltage/reactive power violations. This ranking information can be displayed along with the contingency list. The ranking can be used as a guide in the process of establishing the active contingencies for each of the groups, and also in selecting a stopping criterion for the contingency screening process.

Severity ranking calculates each contingency's performance indices after a full FDPF solution, while contingency screening calculates each contingency's performance indices after the screening iterations. The contingency screening calculates active power performance and voltage/reactive power performance indices, while the severity ranking calculates a performance index for each of the following categories of contingency violations or base case deviations:

branch flow Normal (or, if selected by the user, Long Time Emergency) limit violations;

bus voltage Normal (or, if selected by the user, Long Time Emergency) limit violations;

reactive power generation limit violations;

bus voltage shifts from base case; and reactive power generation shift from the base case.

For ranking purposes, two severity indexes are calculated, one to be used for Contingency Screening, and one for organizing Full Contingency Analysis output in order of severity. Both rankings are based on a weighted sum of contingency violations and base case deviations, where different weights can be defined for each of the two severity indexes. Weights may be assigned to a whole category (e.g., bus voltage limit violations) or for individual violations or base case deviations.

Any branch, the reactive component of any generator, and any voltage level within a station may be included in the Violation Check List. Each of these elements (branches, generators, and voltage levels) has an operator-specifiable priority associated with it. The user may select, for each execution of the SA procedure, the priority range to be used for selecting the elements to be in the Violation Check List (e.g., all elements in priority range 2-4). All branches, generators, and voltage levels within the specified range are included in the Violation Check List and are checked for violations.

A user can specify the percentage of the ratings at which a violation message is to be generated for branch flow limit violations, bus voltage limit violations, bus voltage drop violations, generator MVAR overloads, and generator MVAR shift violations. For example, an 80 percent branch flow normal limit violation would result in a violation message whenever a branch is loaded to more than 80 percent of its normal limit.

The Violation Check List can include checks for:
branch flow Normal limit violations;
branch flow Long-Term Emergency limit violations;
branch flow Short-Term Emergency limit violations;
branch flow Load Dump limit violations;
bus voltage limit violations;
bus voltage drops from base case; and
reactive power generation limit violations If the contingency consists of a generator unit or load outage, the lost generation (or load) is distributed among the rest of the generators in the system by a Generator Allocator subfunction using participation factors. Two sets of participation factors exist: Long Term and Short Term participation factors. The Long Term participation factors represent the effects of an economic re-dispatch of power. The use of Long Term or Short Term participation factors is user-selectable on an individual contingency basis. The Generator Allocator participation factors are pre-specified and can be user modified. Unit MW limits and islanding are respected by the Generator Allocator subfunction. If the loss of generation and/or load cannot be made up by the other units in an island, an error message is issued stating that an island cannot be solved.

An individual branch or bus can be associated with a set of equipment changes called cascading equipment outages. If a branch's flow or a bus voltage is violated during a contingency simulation, the associated equipment changes are added to the contingency equipment changes and the contingency is re-simulated. Valid cascading equipment outages include branch outages, capacitor/reactor outages, generator outages, load element outages; and switching device operations (open or close).

Another subfunction of the SA procedure deals with load changeover operations, which are associated with specific line or transformer equipment outages. A load changeover operation is defined by specifying the source node(s) of the load to be moved, the receiving load node(s), and the percentage of the source load the receiving node(s) load should be increased by. Any lost MW load after the changeover is subtracted from the system generation and the Generator Allocator subfunction, described above, is called to reach a power balance.

Changes in the status of logical devices (e.g., breakers, switches) can cause topology changes within a station. Should this occur, the network representation internal to the SA process is modified accordingly during the simulation of the contingency.

A possible outcome of opening a logical device is a bus split. In order to detect a bus split, the SA procedure examines the substation topology on a breaker level and decides if any new buses are created. If any of these new buses are isolated, then all equipment connected to such new buses will be removed during the simulation of the contingency causing the bus split. If any new non-isolated buses are created due to bus splitting, then the network representation internal to the SA procedure is modified accordingly during the simulation of the contingency. If a bus connected to a generator (or load) is split by the contingency, the SA procedure associates the generator (or load) with the bus that contains the node that the generator (or load) is connected to in the network model.

If the closing of a logical device merges two buses within a station, a station topology rebuild is performed. Closing a logical device can reconnect a generator or load that was dead in the base case. However, this generator or load has no injection capability and the MW and MVAR injection are set to zero.

The SA procedure in accordance with the present invention also has the capability to analyze voltage control. The equipment that performs voltage regulation control includes generating units, LTC transformers, Static Var Compensators (SVCs); and Voltage Control Capacitors and Reactors. Voltage Control is performed within the limits of the regulating device using the base case capability curves. MVAR limits are respected for generating units, static var compensators, and voltage controlled capacitors/reactors. Transformer tap position limits are respected during LTC transformer voltage control. The setpoint voltage is defined as the solved base case voltage for the terminal bus.

A system operator can enable/disable generator, SVC MVAR limiting, voltage controlled capacitor/reactor switching, and LTC transformer tap changing. Each type of control may be enabled or disabled on a global basis, on a company basis, on a contingency basis, or on an individual equipment basis.

To simulate generator and SVC MVAR limiting, a bus type changing scheme is used. In this scheme, reactive injections at generator buses are checked against their limits. For those buses with violations, the reactive injection is set at the limit value, the bus type is changed to a load bus, matrix factors are updated and the solution process is continued. If, at some later time, the bus can be converted back to a generator bus at the scheduled voltage without any violations, it is converted back to a generator bus.

Unit Commitment

An exemplary embodiment of a Unit Commitment (UC) procedure in accordance with the present invention will now be described. An important aspect of operating a power system is the scheduling of thermal generating units (e.g., combustion, steam, nuclear) and power transactions to supply the load with power at a minimum operating cost. Minimum costs are achieved by determining the most economical start up and shut down times for the thermal units and power transactions, and their associated output power levels.

The study period considered by the UC procedure is divided into intervals (e.g., hour, half-hour), and the unit commitment problem is treated as a discrete-time problem. At every time interval, decisions of starting up and shutting down generating units are made. In an exemplary embodiment, the UC procedure operates with a basic time step of one hour with a study horizon ranging from the basic time step (i.e., 1 hour) to 168 hours (1 week).

To assure the determination of realizable schedules, the UC procedure takes into account a variety of operating constraints relating to the generating units, plants and the overall energy system. Furthermore, in order to maintain the security of the transmission system, the UC procedure takes into account transmission flow limits and transmission losses (by means of penalty factors).

In addition to providing generation to meet the load, scheduled units must also provide reserve margins to meet uncertainties of the forecasted load or to cover equipment failure. The provision of these reserve margins and satisfying other constraints entails additional cost.

The UC procedure of the present invention minimizes costs including fuel cost, unit startup cost, unit operating and maintenance cost and power transactions cost.

The UC procedure can operate in real-time mode (i.e., automatically at regular time intervals) or in a study mode. When operating in real-time mode the starting point of the UC study period is the current time, while in study mode, the starting point is user-selectable. The end point is the end of the current or next study horizon or the end of an energy limitation, if applicable.

The UC procedure provides the status (e.g., ON or OFF), as well as the power outputs of thermal units at every time step. The UC procedure also determines the optimal scheduling of interchange transactions.

As discussed, the primary objective of the UC procedure is to determine the startup and shutdown schedule of available generating units as well as the scheduling of power transactions to meet system load and reserve requirements at minimum cost for an entire study period, subject to a variety of equipment, system, and environmental constraints.

Input data to the UC procedure include 1) unit data, 2) unit group data (e.g., plant data), 3) interchange data, and 4) system data. The input data can be data that is constant over the study horizon or data that is variable over the study horizon. Variable data can be specified by a schedule.

The unit data considered by the UC procedure includes unit status, unit type, unit constraints, unit operation curves and unit cost data.

The unit status can be specified for each unit, for each time step. Units can be "available," in which case they may be committed or decommitted, as decided by the UC procedure. Units can be "fixed," in which case they are not considered for optimization purposes. Fixed units are usually nuclear or very large steam units. Units can be "must-run" units, such as those units which must be kept on-line for voltage control purposes. Must-run units must not be decommitted but they may be dispatched to a higher or lower level of generation. Finally, units can be "unavailable." Units whose status is "unavailable" are off-line due to scheduled maintenance or forced outages.

The unit type indicates the type of generation unit, such as nuclear, fossil-fueled steam thermal, multi-fueled, gas turbines, and combined cycle units.

Unit constraints input to the UC procedure include unit generation limits, such as maximum capacity, maximum generation limit, minimum capacity and minimum generation limit. The minimum and the maximum generation limits constrain the operating range. These limits can be changed by a system operator. The maximum capacity is used as the unit's capability for reserve calculations.

Another unit constraint is derated capacity, which can be specified by a schedule. Partial outages of a unit (e.g., a feed mill being out) can limit the unit's maximum output to a value below its full maximum capacity.

Other unit constraints include: minimum up-time (if the unit is turned on-line it must stay on for a certain period of time); minimum down-time (if a unit is shut down it must stay down for a certain period of time); limited ramp rate of unit loading (the maximum allowable change of unit power output between two time steps is limited by the sustained ramp rate, which may be different for load increase and load decrease); reserve contribution limits (as the reserves have to be available within a specified period of time, the contribution of each unit to these reserves can be limited); maximum up-time (if the unit has a limit on energy that can be generated because of fuel or other constraints); and unit dependent conditions (some units can only be started up if a certain unit is already in operation or off-line).

As mentioned, the UC procedure can also use as inputs the operation curves of generating units. The operator can enter the input/output curve, the heat rate, and/or the incremental heat rate curve for each unit. Each unit may be associated with several operation curves to consider different fuels or different cooling agent temperatures. The operator can specify the cost curve of a unit at every time step by assigning an input/output curve and a fuel type to the unit at every time step via schedule displays.

Unit cost data which can be input to the UC procedure can include fuel costs, start-up cost, shut down cost, start up cost when cooling down the unit's boiler (this cost depends on the time interval between the last shutdown and start up), operating and maintenance costs and penalty factors. As mentioned, the UC procedure can also consider unit group constraints. A group of units can be defined for units which are coupled, for example, by the primary fuel supply (e.g., gas pipe line or oil tank storage). Other unit group constraints include plant-related constraints. For example, crew or auxiliary system limitations may limit the maximum number of units at a plant which can be started up simultaneously.

The UC procedure can also take into account data for interchange transactions with a neighboring utility or pooling arrangement. Such data is provided from an Interchange Transaction Scheduler (ITS) function. For each utility, several transactions may exist. All transaction-related data can be modified/entered by the operator via the ITS function.

Constraints related to interchange transactions include start and stop time, maximum interchange power for each time interval, minimum interchange power for each time interval, and maximum/minimum energy over a certain time period. In addition to constraints, the UC procedure can also consider cost data related to interchange transactions, including energy price of the transaction, capacity price of the transaction and penalty factor.

The UC procedure can also consider system-wide constraints. One such constraint is total system demand. The total system demand is determined by the SLF function 26 or may be specified by the system operator.

Another system-wide constraint is desired spinning reserve which can be specified in several ways: by a spinning reserve schedule (a fixed MW amount is given for each time interval); as a percentage of forecast load (the total capacity of the committed units at any time interval exceeds the forecast load of that interval by a certain amount); as a percentage of largest unit on-line (the loss of generation of the largest unit on-line can be picked up within a specified time); or by other generation reserve policies to be implemented.

Other system-wide constraints that can be applied as inputs to the UC procedure include: desired standby reserve (the possible data input for the standby reserve requirement is similar to the definition of the desired spinning reserve); required system ramping capability (the on-line units must have the capability to follow strong load variations); and transmission network constraints (imposed minimum/maximum flow limits on certain critical transmission lines at a particular or multiple time periods).

The exemplary UC procedure of the present invention uses an Augmented Lagrangian Relaxation algorithm to provide a unit commitment solution. Other algorithms that can be used include merit order (according to average unit's costs), dynamic programming, the branch and bound method, and Benders decomposition. The objective of the master problem for unit commitment is to minimize the total system cost, TSC, over the entire study period:

$$TSC = \sum_t \sum_i [F_i(P_{i,t}) + TNC_{i,t}] \quad \text{(EQ. 1)}$$

Where:
t=Hour of study period
i=Generating unit or dispatchable transaction index
Pi,t=Generation of unit i or MW level of dispatchable transaction i at hour t
Fi=Production Fuel cost of unit i or cost of dispatchable transaction I
TNCi,t=Transition cost that is the sum of start up and shut down costs.

The minimization of TSC is subject to the above-described constraints which are taken into account by the UC procedure, e.g., coupling constraints such as the generation/load/interchange balance equality constraint, reserve inequality constraints, transmission transfer interfaces or lines/transformers flow constraints, etc. These constraints can be represented as follows:

$$\sum_i U_{i,t} \cdot P_{i,t} = D_t \quad t = 1, \ldots, T \quad \text{(EQ. 2)}$$

$$\sum_i U_{i,t} \cdot f_{i,m}(P_{i,t}) \geq R_{t,m} \quad t = 1, \ldots, T; m = 1, \ldots, M \quad \text{(EQ. 3)}$$

Where
m=Coupling constraint index
M=Number of coupling constraints
T=Number of time increments in the study period
Ui,t=Operating status of unit i at hour t
Dt=System demand requirement at hour t
fi,m=Contribution of unit/dispatchable transaction to constraint m
Rt,m=Value of constraint requirement m at hour t.

The above system constraints are relaxed and added to the cost function using Lagrange multipliers. In addition, quadratic penalty terms associated with system demand requirements are added to the objective function to improve the convexity of the problem. The Augmented Lagrangian function, L, can therefore be written as:

$$L = \sum_t \left\{ \sum_i [F_i(P_{i,t}) + TNG_{i,1}] - \lambda_t \cdot \left[\sum_i U_{i,t} \cdot P_{i,t} - D_t\right] + c/2 \cdot \left[\sum_i U_{i,t} \cdot P_{i,t} - D_t\right]^2 - \sum_m \mu_{t,m} \cdot \left[\sum_i U_{i,t} \cdot f_{i,m}(P_{i,t}) - R_{t,m}\right] \right\} \quad \text{(4)}$$

where c is a penalty factor or penalty weight.

The Augmented Lagrangian function L can be initialized based on the difference between the largest and smallest system incremental costs divided by the difference between load values corresponding to the system lambdas Except for the quadratic term, the Augmented Lagrangian function L is separable and the master problem can be decomposed into a set of independent subproblems each associated with its own local constraints. To overcome the non separability of the quadratic term and maintain the separability of the problem, the Auxiliary Problem Principle is used to linearize the quadratic terms around the current operating point. Thus, the augmented Lagrange function for the subproblems in the (k+1)th iteration is:

$$L = \sum_t \left\{ \sum_i \left[ F_i(P_{i,t}) + TNC_{i,t} - \lambda_t \cdot P_{i,t} - \sum_m \mu_{t,m} \cdot f_{i,m}(P_{i,t}) + c \cdot P_{i,t} \cdot \left(\sum_j P^k_{j,t} - D_i\right) - \frac{c}{2} \sum_j P^k_{j,t} \cdot P^k_{j,t} \frac{1}{2\varepsilon}(P_{i,t} - P^k_{i,t})^2 \right] + \lambda_t D_t + \sum_m \mu_{t,m} \cdot R_{t,m} \right\} \quad \text{(5)}$$

In the convex case, the algorithm converges when $1/e > 2c$. For a given set of Lagrange multipliers, these local optimization subproblems can be solved independently using a single unit dynamic programming (DP) method. Within the local optimization subproblems the coupling constraints have no direct effect; they are represented only indirectly through the Lagrange multipliers that are used to modify their objective functions. The single unit DP solution observes all local constraints, i.e., those that apply to unit operation (maximum and minimum power limits, minimum up and down times, ramp rates, etc.). In a single unit DP, all unit characteristics can be rigorously represented while maintaining a reasonably small state space to ensure low execution time. The solutions of the unit problems are coordinated within each plant to meet the plant start-up constraint by solving the unit problems in order of solution priority, and constraining start-ups of lower priority units based on the solutions for higher priority units.

The master problem solution is concerned with adjusting the values of the Lagrange multipliers in order to satisfy the coupling constraints. This can be done with an iterative process. At every iteration, all subproblems are solved for a given value of the Lagrange multipliers. Then the multipliers are updated using a subgradient technique in which the change in the value of each multiplier is proportional to the violation of its associated coupling constraint.

The computation of the coupling constraints violations is based on a dynamic merit order that is changing from one iteration to another. The dynamic merit order utilizes the information from the dual subproblem (dual cost, MW levels, etc.) to order the units/transactions from the cheapest to the most expensive. Whether a unit is committed or not at a particular time step depends on the unit's position in the dynamic merit order list. Units are committed from the list one-by-one until the coupling constraints are satisfied. If the number of units/transactions is not enough, the value of the violation is computed and the corresponding Lagrange multiplier is updated to prepare for another iteration. The commitment of units from the priority list takes the local constraints such as minimum up and down times into account.

It should be noted that this algorithm maximizes the dual problem while maintaining the feasibility of the master problem, in contrast to other Lagrangian approaches that attempt to maximize the dual function then struggle to obtain a feasible primal solution using different types of system dependent heuristics.

Once a commitment solution has been obtained, dispatch levels for the committed units are determined so as to minimize the production costs by dispatching on-line units and committed dispatchable transactions to the most economical MW levels. The dispatch can be formulated and solved in a known way as, for example, an economic dispatch problem based on an equal lambda approach.

The output of the Unit Commitment procedure can be presented to the operator in tabular and graphic displays to assist in the evaluation of the results. Output results include a commitment schedule which specifies 1) the committed units at each time interval of the scheduling period, 2) the generation level of each committed unit, 3) the utilization of interchange transactions, and 4) the interchange power of each transaction.

In addition, the UC procedure can output production costs (per unit, per plant and per total system) including fuel consumption and fuel costs at each time interval and over certain time periods (e.g., a day), start-up costs, and operating and maintenance costs.

The UC procedure also generates, in a known way, transmission line flows (on certain lines in the power system) and reserves (spinning and total standby reserve at each time interval, per unit and per total system).

Security Constrained Dynamic Optimal Power Flow (SC-DOPF)

An exemplary embodiment of a Security Constrained Dynamic Optimal Power Flow (SCDOPF) procedure in accordance with the present invention, will now be described.

The SCDOPF procedure of the present invention performs an optimal power flow (OPF) function while recognizing constraints derived from system conditions other than the current operating state. In most cases, this involves considering steady-state, post-contingency operating limits and constraints as part of the pre-contingency optimization. For example, one goal may be to determine the lowest cost power flow solution with the stipulation that all steady-state constraints are within some emergency limits. Another goal may be to determine the set of appropriate preventive and/or corrective actions within the control limits that can be applied within the appropriate time following any one of several specified contingencies.

As described above in connection with FIG. 4, the SCDOPF procedure operates in a closed loop with the Security Analysis (SA) procedure. The SA procedure provides a list of critical contingencies and related constraints and sensitivities. The SCDOPF procedure provides the capability to eliminate (or to reduce, if complete elimination is not possible) constraint violations in the current system state and/or constraint violations in a set of critical contingency states, while at the same time minimizing the total generation price through the redispatch of controls.

The SCDOPF procedure is implemented by adding security constraints to the Dynamic Dispatch problem. These constraints impose additional limits on branch flows for the post-disturbance configurations resulting from a given set of contingencies. This leads to the concept of system security, where the objective is to keep the system in a normal state during the relatively long periods between disturbances and to insure that, on the occurrence of a major disturbance, the system does not depart from a normal state.

As described above, the SCDOPF procedure executes as part of the day-ahead and LMP calculation process in the multi-settlement subsystem 120. The SA procedure evaluates a list of contingencies and reports the problems caused by the contingencies. All selected critical contingencies are simulated and resolved using the SCDOPF procedure. After the rescheduling of controls as a result of an iteration of the SCDOPF procedure, the SA procedure performs a new linearization and checking of binding and near binding constraints for each critical contingency.

The SCDOPF procedure simultaneously solves the base case violations and all critical contingency violations. As a result, new unit base points and critical binding constraints for the base case and all contingency cases are formed. As a by-product, locational marginal prices (LMPs) for all control buses are obtained.

The exemplary SCDOPF procedure of the present invention can operate in one of three user-selected solution modes: Preventive Mode, Corrective Mode or Preventive/Corrective Mode.

In Preventive Mode, all control variables are optimized such that no post-contingency adjustments are necessary in order to avoid violation of base case and post-contingency constraints. This is the most secure solution mode, as no operator intervention is required following an anticipated contingency. The consequences of such a solution are a higher pre-contingency objective function (i.e., higher cost of system operation) and a generally more difficult problem to solve. In some cases, the preventive mode solution may not even exist, especially for more severe contingencies under high load system conditions.

In Corrective Mode, the control variables are permitted to adjust after the contingency occurs. This is a less secure mode of operation since operator action is required soon after a contingency to reach an acceptable operating state. Such a problem is generally easier to solve, since there are more degrees of freedom in the control adjustments. The corrective mode is solved as a sequence of independent optimization problems, one per contingency.

In Preventive/Corrective Mode, some of the violations for the violated constraints are relieved in the preventive mode, and the rest are relieved in the corrective mode. While this mode presents a significantly larger optimization problem to be solved than the preventive mode, it is more likely than the preventive mode to have a feasible solution. Most of the control variable changes are made post-contingency, and a few control changes are made in the pre-contingency state (base case). The consequences of such a solution are a lower pre-contingency objective function (i.e., lower cost of system operation), and a generally easier (less constrained) problem to solve than in the preventive mode. This should be the preferred solution mode, especially in cases when the preventive mode SCDOPF requires expensive rescheduling of the base case generations. Operating a power system at a much higher cost in order to avoid limit violations in some contingency cases is not desirable and may not be justifiable considering that the problem can be remedied by combining preventive and corrective control actions.

When operating in Preventive Mode, at each main SCDOPF iteration the following optimization problem is formulated and solved:

$$\min \sum_{t=1}^{24} \sum_{i=1}^{nc(t)} C_i(x_i(t)) \quad\quad (\text{EQ. 6})$$

subject to:

load balance constraints:

$$\sum_{i=1}^{nc(t)} \frac{x_i(t)}{pfbi(t)} = 0 \; t = 1, \ldots, 24 \quad\quad (\text{EQ. 7})$$

limits on control variable changes:

$$a_{li}(t) \le x_i(t) \le a_{ui}(t) \; i=1, \ldots, nc(t); \; t=1, \ldots, 24 \quad\quad (\text{EQ. 8})$$

branch flow limits for the base case and critical contingency cases:

$$\sum_{i=1}^{nc(t)} s_{li}(t)x_i(t) \leq c_l(t) \; l=1,\ldots,nbr(t); \; t=1,\ldots,24 \quad (EQ.\ 9)$$

reserve constraints:

$$\sum_{i=1}^{nr(t)} (a_{li}(t)-x_i(t)) \geq SR(t) \; t=1,\ldots,24 \quad (EQ.\ 10)$$

and ramp rate limits:

$$r_{di}(t) \leq x_i(t+1)-x_i(t) \leq r_{ui}(t) \; i=1,\ldots,nc; \; t=1,\ldots,24 \quad (EQ.\ 11).$$

The following terms are used in EQs. 6-11:

| | |
|---|---|
| $x_i(t)$ | the value of control variable (generator or dispatchable load) i at the hour t |
| $C_i(x_i(t))$ | price of generator or dispatchable load i at the hour t |
| $pfbi(t)$ | loss penalty factor at the bus at which control variable i is connected at the hour t |
| $a_{li}(t), a_{ui}(t)$ | lower and upper limits on changes of control variable i at the hour t, respectively |
| $c_l(t)$ | branch flow base case or contingency case violation for branch l at the hour t |
| $s_{li}(t)$ | the sensitivity of flow in line l with respect to control i at the hour t |
| $r_{di}(t), r_{ui}(t)$ | lower and upper limits on control variable changes between two adjacent hours |
| $SR(t)$ | the system spinning reserve requirement at the hour t |
| $nc(t)$ | the number of control variables at the hour t |
| $nbr(t)$ | the number of violated branch flow constraints for the base case and all the simulated contingency cases at the hour t |
| $nr(t)$ | number of generators providing spinning reserve at the hour t |

The above formulation in the case of the multi-settlement subsystem 120 produces a very large optimization problem. Large optimization problems have typically been solved using special linear programming (LP) techniques. LP techniques, however, are not suitable when the number of constraints and/or the number of controls is very large. To avoid this problem, the known LP implementations have had to severely limit the number of contingencies and related critical constraints that are to be modeled. This approximation presents an unresolved modeling problem for most known SCOPF implementations. By fixing just a small subset of most critical contingencies, there is no guaranty that other contingencies labeled as non-critical will not become critical after a new solution.

In accordance with the present invention, however, the aforementioned problems associated with LP implementations are avoided by using a method that allows accurate simultaneous modeling of all contingencies for every hour of the day-ahead scheduling period. With the present invention, it is possible to directly involve and model a large number of critical contingencies in the SCDOPF formulation. In an embodiment of the present invention, the resulting optimization problem is solved using a predictor-corrector interior point method, as described in U.S. patent application Ser. No. 09/273,148, entitled SECURITY CONSTRAINED OPTIMAL POWER FLOW METHOD, filed on even date herewith and incorporated herein by reference, in its entirety.

When the SCDOPF procedure is carried out in the preventive/corrective mode, the following formulation is used:

$$\min \sum_{t=1}^{24} \sum_{i=1}^{nc(t)} C_i(x_i(0,t)) \quad (12)$$

subject to:

load balance constraints:

$$\sum_{i=1}^{nc(t)} \frac{x_i(k,t)}{pfbi(t)} = 0, \; k=0,\ldots,ncon(t); \; t=1,\ldots,24 \quad (13)$$

limits on control variable changes:

$$a_{li}(k,t) \leq x_i(k,t) \leq a_{ui}(k,t), \; i=1,\ldots,nc(t); \; k=0,\ldots,ncon(t); \; t=1,\ldots,24 \quad (14)$$

branch flow limits for the base case and critical contingency cases:

$$\sum_{i=1}^{nc(t)} s_{li}(t)x_i(0,t) \leq c_l(t), \; l=1,\ldots,nbrl(t); \; t=1,\ldots,24 \quad (15)$$

$$\sum_{i=1}^{nc(t)} s_{li}(t)[x_i(0,t)+x_i(k,t)] \leq c_l(t), \; l=nbrl(t)+1,\ldots,nbr(t); \quad (16)$$

$$k=1,\ldots,ncon(t); \; t=1,\ldots,24$$

reserve constraint:

$$\sum_{i=1}^{nr(t)} (a_{li}(0,t)-x_i(0,t)) \geq SR(t), \; t=1,\ldots,24 \quad (17)$$

and ramp rate limits:

$$r_{di}(t) \leq x_i(0,t+1)-x_i(0,t) \leq r_{ui}(t), \; i=1,\ldots,nc; \; t=1,\ldots,24 \quad (18)$$

The following terms are used in EQs. 12-18:

| | |
|---|---|
| $x_i(k,t)$ | the value of control variable (generator or dispatchable load) i at the hour t in mode k (k = 0 preventive mode control changes, k = 1, . . . , ncon(t) corrective mode control changes) |
| $C_i(x_i(0,t))$ | price of generator or dispatchable load i at the hour t |
| $a_{li}(k,t), a_{ui}(k,t)$ | lower and upper limits on changes of control variable i at the hour t for mode k, respectively. |

By taking into account the ramping constraints of the generating units (Eq. 11), the SCOPF procedure of the present invention provides a novel security-constrained dynamic OPF (SCDOPF). In an exemplary SCDOPF procedure as an initial step, the system load curve over 24 hours is searched for the time interval (e.g., hour) with the highest load (the "maximum load hour" or MLH). The exemplary SCDOPF procedure described above is then carried out for the maximum load hour, without taking the ramp-up or ramp-down limits of the generating units into account.

The SCDOPF procedure is then carried out for each hour after the MLH, until the end of the day, and each hour before the MLH, until the beginning of the day. In this case, generation unit ramp constraints are taken into account. The processing of hours after the MLH can be done independently of and in parallel to the processing of hours preceding the MLH. Such parallel processing can be advantageously performed by parallel CPU architectures such as that described above.

For purposes of illustration, consider a generation unit that is scheduled to produce 50 MW during the MLH and which can vary its power output up or down by 5 MW/min. Assuming a 10 min range time in the hour following the MLH and in the hour preceding the MLH, that generator can produce 0 to 100 MW. This range is then used as a constraint by the SCDOPF procedure of the present invention for the hour preceding and the hour following the MLH.

It is possible, however, that with the MLH as the initial point, that the SCDOPF problem is unfeasible; i.e., cannot be solved. In that case, a different initial point can be selected by searching for the two contiguous hours with the largest load change between contiguous hours. Of those two hours, the hour with the larger load is selected as the starting point. Starting with that hour, the above procedure is repeated.

LMP Calculation

The results of the final SCDOPF execution are used in step 413 to calculate Locational Marginal Prices (LMPs) for the day-ahead settlement process of FIG. 4. The following information for each hour of the day-ahead scheduling horizon is available:

The marginal prices of generation $\lambda_i$, $i \in G$

The marginal price of generation at the reference bus $\lambda$

The marginal cost of those transmission constraints that are active $\pi_i$, $i \in L$ In addition, the EMS Network Sensitivity (NS) function provides delivery factors ($d_{k,r}$) that approximately model the effects of transmission losses in delivering power from a specific bus k on the system to the reference bus r and sensitivities of the flows in constrained transmission lines with respect to the load at load bus $s_{k,j}$.

Based on this information, the LMPs are calculated for each load bus. The marginal price of load at the load bus k is calculated as:

$$\lambda_k = \lambda \cdot d_{k,r} + \sum_{i \in L} \pi_i s_{k,i} \quad \text{(EQ. 19)}$$

It is possible to calculate the LMPs, with or without marginal losses. Based on data prepared by the ISO the marginal prices at load buses are appropriately aggregated and corresponding zonal prices are calculated.

The day-ahead LMP Calculation function supplies the calculated LMPs to the Scheduling Database 130 for posting purposes and to the Accounting Database 190 for Billing and Settlement activities. Generators selected by the UC procedure receive the LMPs as calculated for the generators' points of injection for the level of generation required to serve the day-ahead load bids. The loads will pay the zonal LMPs associated with their zone of extraction for the energy that they have bid into the day-ahead market.

Hour-Ahead Scheduling

From the time the day-ahead schedule of operation is completed and communicated to the Market Participants 50, up to the actual operating hour, a Market Participant may inform the energy market system 100 of changes to the participant's scheduled commitments. These participant adjustments might be in response to changed conditions affecting generation or loads or to changed expectations about the direction of prices between the day-ahead market and the real-time market. These adjustments are treated as deviations from the day-ahead schedules. The participants would still be financially committed to the day-ahead schedules at the day-ahead prices. Market Participants could cover their day-ahead schedules (forward sales) either by operating according to the day-ahead schedules or by settling any deviations from the day-ahead schedules at the real-time prices determined from the actual dispatch. During this timeframe, additional generation may be scheduled with an hour-ahead scheduling procedure in accordance with the present invention. The commitment of additional units in the hour-ahead market is based on minimization of start-up and no-load bids.

The following adjustments may be made on an hour-to-hour basis prior to the operating hour:

A Market Participant may self-schedule any of its resource increments, including hydro power resources not previously designated as Self-Scheduled Resources and not selected as a Pool-Scheduled Resources.

A Market Participant may request the scheduling of a new bilateral transaction that uses non-firm transmission service (not paying congestion charges).

A Market Participant may remove from service a resource increment, including a hydro power resource that it had previously designated as a Self-Scheduled Resource, provided that the market system has the option to schedule energy from such resource increment at the price offered in the scheduling process, with no obligation to pay any start-up fee.

An External Market Buyer may refuse delivery of some or all of the energy it requested to purchase by notifying the energy market system of the adjustment in deliveries later that one hour prior to the hour in which the adjustment is to take effect.

Generation that was scheduled in the day-ahead market could lower its bid prices.

Transmission customers not scheduled in the day-ahead market can submit bilateral transaction schedules.

External bilateral transactions may revise their schedules up to one hour before the operating hour. Such deviations from the day-ahead schedule will pay congestion charges based on the real-time prices.

Generators can inform the market system of the bilateral or self-scheduling of generation segments not in the day-ahead schedule. Loads and transmission customers scheduled day ahead could submit adjustments to their existing schedules.

Flexible generators, loads and transmission customers not scheduled in the day-ahead scheduling process to either operate or provide reserves could submit bids to provide additional generation or load, and could submit additional transmission schedules with incremental and decremental bids. These bid prices could be either higher or lower than those submitted for these same generation resources or loads in the day-ahead scheduling process.

Flexible generators, loads and transmission-only customers scheduled in the day-ahead scheduling process to either operate or provide reserves can lower their bid prices (relative to those submitted in the day-ahead settlement) but can not raise them. Quantity changes would be allowed (i.e., withdrawal of units due to forced outages) but would not affect the financial commitments determined by the day-ahead schedule.

Inflexible generators, loads and transmission customers could submit schedules for additional generation, load and bilateral transactions.

In accordance with the present invention, hour-ahead rescheduling, without need for commitment of additional units, is performed by execution of the SCDOPF procedure and the SA-SCDOPF loop. The SCDOPF procedure is run to obtain a basic optimal solution. Following this, the SA-SCDOPF loop is performed to obtain an optimal solution with no violations in the base case and in the contingency cases set forth in the contingency list.

If for the hour-ahead rescheduling it is necessary to commit additional units, the MUC procedure (commitment with start-up and no load cost) performs the commitment of the additional units. The total capacity of units that must be committed in the MUC run, and the available set of units that are candidates for commitment are in as inputs to the MUC procedure. Following this, the SCDOPF procedure and the SA-SCDOPF loop are run to obtain the final optimal solution.

The resulting schedules are transmitted to the Scheduling Database 130 for posting purposes. The results are also communicated to the EMS 15 for next hour operations. The results of the hour-ahead scheduling process are supplied to the Accounting Database 190, such as for audit purposes. These are not used for billing and settlement calculations. The real-time settlements are calculated based on actual real-time information received from the EMS system and from the real-time LMP calculation function 16.

The hour-ahead scheduling process can use the same graphical user interface provided for the day-ahead scheduling process. A system operator can inspect hour-ahead scheduling results prior to transmittal to the scheduling database, to the Accounting database, or to the EMS system and to modify inputs and rerun the scheduling function.

FTR Auction Subsystem

As mentioned above, in addition to providing a multi-settlement subsystem 120, the exemplary embodiment of the energy market system 100 of the present invention also includes a Fixed Transmission Right (FTR) Auction subsystem 160, which will now be described in greater detail.

An FTR is a financial instrument that can hedge its owner against congestion charges incurred on a specific transmission path. An FTR provides its owner with the right to receive congestion credits, for a specified amount of power, when the power system is congested. The revenues associated with congestion charges are redistributed to the owners of FTRs. This essentially provides the owner of an FTR with the right to transfer a specific amount of power over a transmission path, for a specific price, regardless of congestion charges that might otherwise apply.

The FTR Auction subsystem 160 provides for the purchase and sale of FTRs in a centralized auction. Market participants may submit bids for the purchase of FTRs in the auction. They may also offer FTRs for sale in the auction. The auction system will maximize the revenues collected by the ISO from the FTRs while maintaining the ability of the transmission system to simultaneously support the awarded FTRs.

Each FTR is characterized by the time period over which the FTR is valid and the busses to which the FTR applies. An FTR may be between a single bus and a single bus, a single bus and multiple busses, multiple busses and a single bus, or multiple busses and multiple busses. The busses used in the designation of an FTR must be busses where Locational Marginal Prices (LMPs) are calculated. An FTR may be designated with an injection location inside the ISO's control area and a withdrawal location outside of the control area, with an injection location outside of the control area and a withdrawal location inside of the control area, or with both the injection and withdrawal locations inside of the control area.

There are several different ways to acquire FTRs. It is the method of acquisition that differentiates FTRs. FTRs can be acquired as follows:

Network Integration Service FTRs—these are FTRs that are awarded to network service transmission customers.

Firm Point-to-Point Service FTRs—these are FTRs that are awarded to firm point-to-point transmission customers. They have time periods based on the duration of the reserved transmission service.

Secondary Market—the holders of Firm Transmission service may sell the FTRs to Market Participants in a secondary market.

FTR Auction—Market Participants may buy and sell FTRs through an auction, such as that provided by the auction subsystem of the present invention.

FTRs acquired by one of the first three methods are referred to as pre-allocated FTRs. These will form a base level of FTRs during the simultaneous feasibility procedure of the FTR Auction, described below.

There are essentially three time periods associated with the FTR Auction process. The first is the advance information time period, during which the expected FTR capacity that will be available during the auction will be determined and publicly posted (e.g., on the Internet via the MUI). Historical information related to congestion prices and limiting conditions on the energy system preferably are also posted.

The second time period is the deadline by which Market Participants art to submit auction information. By day N the market participants should submit bids for FTRs they wish to purchase in the auction or offers for FTRs they wish to sell. In accordance with the FTR auction process, to bid on an FTR for purchase, a potential purchaser specifies the power injection and withdrawal locations, the desired capacity and the bid price. When offering an FTR for sale, the potential seller specifies the power injection and withdrawal locations, the FTR's capacity and a reservation bid, i.e., the minimum price the seller wishes to receive.

The FTR auction will then be run to determine which set of bids to award, along with which set of FTRs to sell. By day N+1 the winning set of bids (both sale and purchase) are posted along with the market-clearing prices for the FTRs. The winning bidders will pay the market-clearing price for the FTRs they acquire in the auction while the FTR sellers will be paid the market-clearing price for FTRs they surrender.

FTR auctions can be held periodically, such as once a month. Separate FTR auctions can be performed for peak conditions and off-peak conditions.

The FTR auction system of the present invention also provides a mechanism for the short-term reconfiguration of FTRs. A Market Participant may request, and possibly be awarded, an FTR that is different from any of the FTRs being sold into the auction by sellers. This provides a Market Participant with the opportunity to purchase FTRs that would not otherwise be available through bilateral transactions in a secondary market.

FIG. 1 includes an overview of the FTR auction subsystem 160 of the present invention. The FTR auction subsystem 160 comprises an FTR Auction Database 170 and a processing block 180 which comprises a Case Setup function 181, a Simultaneous Feasibility Test (SFT) function 182, and an FTR Auction Post-Processing function 183. The FTR auction subsystem 160 also interacts with the Application Database (ADB) ISO and the Accounting Database 190 and interfaces with the Market User Interface 110 and the EMS 15.

The Case Setup function 181 assembles the case that will be analyzed by the Simultaneous Feasibility Test (SFT) function 182. The Case Setup function 181 is preferably executed separately for peak and off-peak conditions.

Figure 5:
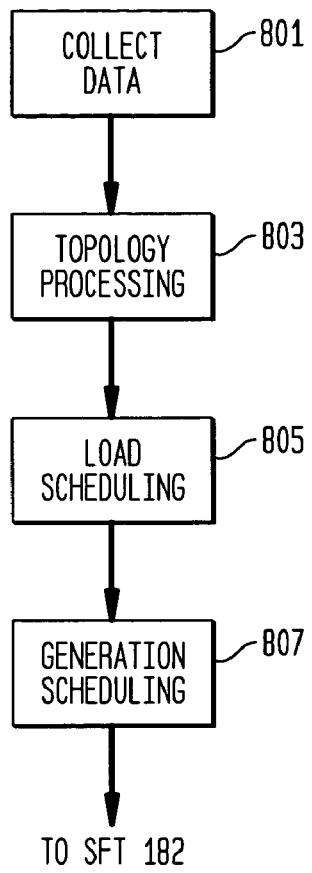
FIG. 5 is a flow chart of an exemplary case setup function for a fixed transmission rights (FTR) auction system in accordance with the present invention.

FIG. 5 is a flow chart which illustrates the steps performed in carrying out the case setup function 181. The first step 801 of the case setup function 181 is to collect information for performing the SFT 182.

The FTR auction database 170 is the main database for the setup of the FTR auction. It can be implemented, for example, as an Oracle database. The Market User Interface 110 stores market participant data and bid information from the market participants 50 in the FTR auction database 170. In addition, data from various subsystems of the energy system to support the FTR Auction is collected in the FTR auction database 170.

The data stored in the FTR auction database 170 includes:
outages that are active for the relevant period (e.g., month);
peak load conditions;
off-peak load conditions;
the pre-allocated FTR information;
the FTR bid information;
the MW limits to use for branch ratings;
the transfer interface limits;
the list of contingencies to analyze;
the information describing zonal and hub aggregate price definitions; and
information about uncompensated parallel flows.

In addition to the aforementioned data stored in the FTR auction database 170, the FTR auction subsystem also accesses the ADB database which contains a breaker-oriented network model of the power system.

Once the above-described data has been set-up, topology processing is performed at step 803 to include the effect of outaged equipment. Load scheduling (step 805) and generation scheduling (step 807) are then performed for loads and generation units external to the ISO's control area. The load and generation scheduling steps 805 and 807 serve to set-up representative conditions for neighboring electrical systems. The bus injections external to the control area are thus determined. The bus injections internal to the control area are determined based on the pre-allocated FTR information.

Figure 6:
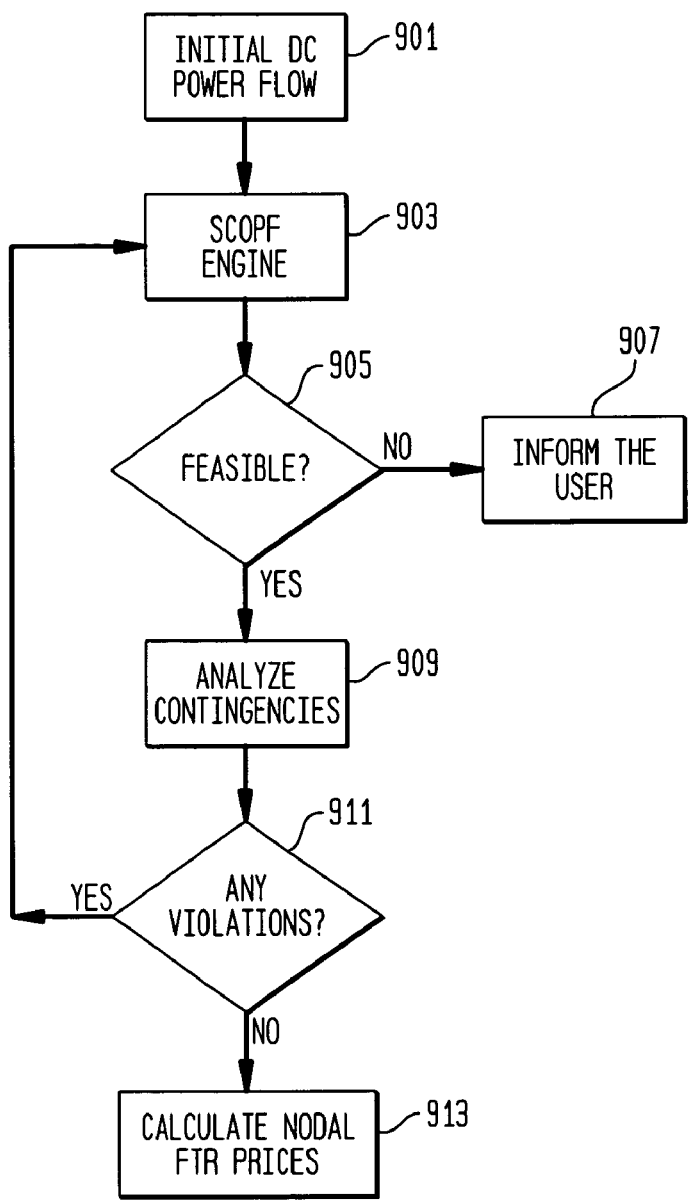
FIG. 6 is a flow chart of an exemplary simultaneous feasibility test for a FTR auction system in accordance with the present invention.

Once the case setup function 181 has been performed, execution proceeds to the Simultaneous Feasibility Test (SFT) 182, which will now be described with reference to FIG. 6. The SFT determines how to maximize the revenue obtained from the auction while insuring that the FTRs that are awarded do not exceed the capacity of the transmission system.

At step 901, an initial DC power flow solution is performed based on the loading defined for the external portion of the system with the loading for the internal portion of the system based on the pre-allocated FTR information. The Model Update (MU) and Dispatcher Power Flow (DPF) functions described above in connection with the multi-settlement subsystem 120 are used to obtain the initial DC power flow solution. Since only DC network solutions are being performed in the SFT, it is not necessary to execute the Regulating Equipment Scheduler component of the model update function. Furthermore, with respect to the DPF, the loading level for the internal portion of the system will correspond to the pre-allocated FTRs. That is, the injections and withdrawals will correspond to the FTRs that are defined, not to the generators and loads of the system. This solution will serve as the starting point to the optimization process.

Following the initial solution provided in step 901, an optimization is performed at step 903 which considers base case constraints only. The optimization is performed using a "static" subset of the SCDOPF procedure described above. In this case, referred to as the SCOPF procedure, the optimization problem being solved is different than the one being solved for the multi-settlement subsystem 120. In this case, the objective function to be maximized is the revenue received by the ISO from the FTRs. Furthermore, the equality constraints include the DC version of the static load flow equations and additional equations that associate the FTR variables with injections and withdrawals at their injection and withdrawal locations. The inequality constraints include the specified capacities of the FTRs being bid (i.e., the limits on the control variables), the limits on the MW flow on branches for the base case network, the limits on the transfer interface MW flows in the base case, and the limits on the MW flow of branches under contingency conditions.

The SCOPF problem that is being solved during the SFT procedure of the FTR auction uses modeling similar to that used for the evaluation of potential transactions during a typical OPF cost optimization solution. At each of the main SCOPF iterations the following problem is formulated and solved:

$$\text{maximize:} \sum_{i=1}^{nc} C_i X_i \quad \text{(EQ. 20)}$$

Subject to:

limits on control variable changes:

$$a_{li} \leq x_i \leq a_{ui} \quad \text{(EQ. 21)}$$

and transfer interface and branch flow limits for the base case and contingency cases:

$$\sum_{i=1}^{nc} S_{li} X_i \leq C_l, l = 1, \ldots, nbr \quad \text{(EQ. 22)}$$

The variables used in EQs. 20-22 are defined as follows:

| | |
|---|---|
| $x_i$ | the value of control variable i, namely the MW value of $FTR_i$. |
| $c_i$ | the price of control variable i, this is either the bid price or reservation price of $FTR_i$. |

| | -continued |
|---|---|
| $s_{li}$ | the sensitivity of flow in line l with respect to control i. |
| $c_l$ | branch flow base case or contingency case limit. |
| $a_{li}$ | the lower limit for control variable i. For a bid to purchase an FTR this is zero. For a bid to sell an FTR this is the negative of the capacity offered for sale. |
| $a_{ui}$ | the upper limit for control variable i. For a bid to purchase an FTR this is the capacity being requested. For a bid to sell an FTR this is zero. |
| nc | the number of control variables (i.e., the number of FTRs) |
| nbr | the number of violated transfer interface limits, base cases branch flow limits, and contingency case branch flow limits. |

If it is determined at step 905 that the SCOPF procedure does not yield a feasible solution, the operator is informed in step 907. If the SCOPF procedure does yield a feasible solution, execution proceeds to step 909 in which the Security Analysis (SA) procedure is used to analyze the impact of contingencies on this solution.

The Security Analysis (SA) procedure is substantially the same as described above in connection with the multi-settlement subsystem 120, with several simplifications. In this case, the power flow solution that is performed is a DC solution, no voltages are calculated or checked for violations, and the contingency screening is real power only.

In the SCOPF portion of the SFT procedure, the control variables are the MW value of the FTRs. These FTR MW values are mapped to bus injections during the SA processing using the matrix W described below. The modified problem to be solved in the SA procedure is:

$$\Delta P = B' \Delta \theta + Wx \quad (\text{EQ. 23})$$

for the base case, and:

$$\Delta P_c = [B' + \Delta B'] \Delta \theta_c + Wx \quad (\text{EQ. 24})$$

for each contingency case.

The terms used in EQs. 23 and 24 are defined as follows:

| | |
|---|---|
| $X_i$ | the value of control variable i, namely the MW value of $FTR_i$ |
| $\Delta P$ | the vector of bus active power mismatches for the base case |
| B' | the active power sub matrix from the Fast Decoupled Power Flow formulation for the base case network |
| $\Delta\theta$ | the vector of bus voltage angle corrections for the base case |
| W | An nbs by nc matrix that maps the MWs associated with an FTR to its injection and withdrawal busses. For example, if $FTR_i$ (or $X_i$) has bus j as its only injection bus and bus k as its only withdrawal location, column i will be all zeroes except for +1 in row j and −1 in row k. For FTRs that have multiple injection busses and/or multiple withdrawal busses, each bus would have a participation factor that indicates the portion of the FTR associated with that bus. All the injection participation factors would sum to +1 and all the withdrawal participation factors would sum to −1. |
| nc | the number of control variables (i.e., number of FTRs) |
| nbs | the number of busses in the system |
| $\Delta P_c$ | the vector of bus active power mismatches for a contingency case |
| $\Delta\theta_c$ | the vector of bus voltage angles for the contingency case |
| $\Delta B'$ | matrix of changes to B' matrix that corresponds to that contingency |

Each of the cases that is solved is checked for violations. The base case is checked for transfer interface limit violations and branch flow limit violations. The contingency cases are checked for branch flow limit violations. For every violation that is detected, the SA procedure will calculate the sensitivity of the flow on the violated branch to the control variables, i.e., to the FTRs. These sensitivities are passed to the SCOPF procedure. The SCOPF procedure then reschedules the control to alleviate the violations in an optimal manner.

If it is determined at step 911 that any contingencies result in new violations, these will be passed back to the SCOPF optimization procedure 903 as constraints which are to be enforced. This process will be repeated until all violations are handled.

Once all violations have been handled and it is determined at step 911 that there are no more violations, execution proceeds to step 913 in which the pricing of FTRs is carried out.

The pricing of FTRs is based on their market-clearing price. All participants pay the market clearing price for the FTRs they buy in the auction, or receive the market clearing price for the FTRs they sell into the auction.

The FTR auction process leads to nodal prices for FTRs (i.e., this would be the price for an FTR from a particular bus to the reference bus). One consequence of this is that it is possible to see the market-clearing price for FTRs between locations that were not bid into the auction.

The calculation of the nodal prices starts from the set of binding constraints during the optimization. Each binding constraint has a marginal cost associated with it. This is how much the objective function would change if the limit on the constraint could be relaxed slightly (assuming all other constraints stay binding). If the injection at a bus is changed it will result in a change in the value of a binding constraint. Multiplying the marginal cost of the binding constraint by the impact on it due to an injection change yields the change in the objective function due to the change in the injection. Adding these terms together for all the binding constraints yields the nodal price for the bus. This calculation is performed for each bus of interest. This procedure is similar to the methodology that is used for the real-time LMP price calculation.

Once the SFT 182 has been completed, execution proceeds to the FTR Auction Post-Processing procedure 183. The Post-Processing procedure 183 transfers the results of the auction to the FTR database 170 and to the Accounting database 190. The information that is transferred to the FTR database 170 is used by the Market User Interface 110 to post auction results on the Web for Market Participants 50 to view.

Separating the post-processing function 183 from the other auction functions provides auction administrators the opportunity to review results before posting them. The following results are transferred by the post-processing function to the FTR database 170: 1) FTRs awarded in the auction; 2) FTRs sold in the auction; 3) the nodal prices for FTRs (or the price for an FTR from a bus to the reference bus); and 4) information about which constraints were binding during the auction.

This information is also transferred to the Accounting database 190 where it can be accessed by the accounting and billing subsystem 17 of the energy system. In addition, the FTR Auction Post-Processing function 183 stores additional data in the Accounting database 190 as necessary to support data archiving and auditing requirements. An auction administrator can retrieve data from this location and transfer it for data warehousing purposes. The accounting database 190 can be implemented using an Oracle database.

For administrative users, Oracle Forms and Application Data Viewer (ADV) displays are also available to aid in operating the auction subsystem 160.

What is claimed is:

1. An energy market system associated with an energy generation and delivery system, the energy market system comprising:
   a market user interface, the market user interface exchanging market information with a plurality of market participants;
   an energy scheduling subsystem, the energy scheduling subsystem scheduling generation and delivery of energy among market participants in accordance with the market information and in accordance with information relating to the energy generation and delivery system, the energy scheduling subsystem further comprising a security analysis function, the security analysis function analyzing the energy generation and delivery system under one or more contingency conditions and with a plurality of energy generation units selected as a result of an auction for operation, the scheduling of generation and delivery of energy based at least in part on the security analysis function.

2. The energy market system of claim 1, wherein the information relating to the energy generation and delivery system includes a model of the energy generation and delivery system.

3. The energy market system of claim 1, further comprising a unit commitment function that selects the plurality of energy generating units selected for operation.

4. The energy market system of claim 1, wherein the energy scheduling subsystem includes an energy pricing function, the energy pricing function determining locational prices for the energy to be delivered.

5. An energy market system associated with an energy generation and delivery system, the energy market system comprising:
   a market user interface, the market user interface exchanging market information with a plurality of market participants;
   a first database, the first database including market information entered by market participants regarding a plurality of generator bids and a plurality of load bids, the first database further including a model of a transmission network; and
   an energy scheduling subsystem operably coupled to the first database, the energy scheduling subsystem scheduling generation and delivery of energy by a plurality of generators in accordance with the market information and in accordance with information relating to the energy generation and delivery system including the model and based upon a security analysis function, the security analysis function analyzing the energy generation and delivery system under one or more contingency conditions with energy generation units selected for operation by an auction.

6. The energy market system of claim 5, wherein the energy scheduling subsystem is operable to generate a first unit commitment based on market forecasted load and using transmission line limits based on the model.

7. The energy market system of claim 5, wherein the energy scheduling subsystem is operable to:
   perform a security analysis procedure determining a set of violations resulting from simulation of at least one contingency case and the first unit commitment, and
   generate a second unit commitment different than the first unit commitment conditionally, said conditional generation based at least in part on the set of violations.

8. The energy market system of claim 5, wherein the energy scheduling subsystem includes:
   a unit commitment function, the unit commitment function selecting energy generating units for operation in the energy generation and delivery system;
   and
   an optimal power flow function, the optimal power flow function determining a configuration of the energy generation and delivery system so as to operate in a secure mode under each one of the contingency conditions.

9. The energy market system of claim 5, wherein the energy scheduling subsystem schedules generation and delivery of energy at least one of a day in advance and an hour in advance.

10. The energy market system of claim 5, wherein the market information includes demand for energy delivery and availability of energy generation.

11. The energy market system of claim 8, wherein the unit commitment function selects energy generating units for operation in each hour of a day in accordance with a study period that includes a plurality of days.

12. The energy market system of claim 8, wherein the energy scheduling subsystem includes an energy pricing function, the energy pricing function determining locational prices for the energy to be delivered.

13. The energy market system of claim 8, wherein an input to the optimal power flow function includes a ramping constraint of a power generation unit.

14. An energy market system associated with an energy generation and delivery system, the energy market system comprising:
   a market interface, the market interface exchanging market information with a plurality of market participants; and
   an energy transmission rights auction subsystem, the energy transmission rights auction subsystem providing for the exchange of energy transmission rights in accordance with the market information and in accordance with information relating to the energy generation and delivery system, said energy transmission rights including a financial instrument providing an owner with a right to transfer a specific amount of power over a transmission path, wherein the energy transmission rights auction subsystem includes (i) a case setup function, the case setup function setting up a market case in accordance with the market information, and (ii) a feasibility test function including a security analysis function, the security analysis function analyzing the energy generation and delivery system under one or more contingency conditions and in accordance with the market case.

15. The energy market system of claim 14, wherein the feasibility test function determines auction results in accordance with information relating to the energy generation and delivery system and the energy transmission rights auction subsystem includes:

a post-processing function, the post-processing function providing the auction results to the market participants.

16. The energy market system of claim 15, wherein the feasibility test function includes:

an optimal power flow function, the optimal power flow function determining a configuration of the energy generation and delivery system so as to operate in a secure mode under each one of the contingency conditions and in the absence of a contingency condition; and an energy rights pricing function, the energy rights pricing function determining prices for the energy transmission rights to be exchanged in accordance with the auction results.

17. The energy market system of claim 14, wherein the market interface exchanges market information with a plurality of market participants over a data communications network.

18. The energy market system of claim 14, wherein the information relating to the energy generation and delivery system includes a model of the energy generation and delivery system.

19. The energy market system of claim 14, wherein the energy transmission rights include fixed transmission rights.

20. The energy market system of claim 16, wherein the optimal power flow function includes a security-constrained optimal power flow function.

* * * * *